US010531545B2

(12) United States Patent
Barna et al.

(10) Patent No.: US 10,531,545 B2
(45) Date of Patent: Jan. 7, 2020

(54) COMMISSIONING A CONFIGURABLE USER CONTROL DEVICE FOR A LIGHTING CONTROL SYSTEM

(71) Applicant: RAB Lighting Inc., Northvale, NJ (US)

(72) Inventors: Ross Barna, Northvale, NJ (US); Michael Theodore Case-Hayes, Northvale, NJ (US); Ankit Sanghvi, Northvale, NJ (US); Jason Lawrence Oliver, Northvale, NJ (US)

(73) Assignee: RAB Lighting Inc., Northvale, NJ (US)

( * ) Notice: Subject to any disclaimer, the term of this patent is extended or adjusted under 35 U.S.C. 154(b) by 0 days.

(21) Appl. No.: 15/492,373

(22) Filed: Apr. 20, 2017

(65) Prior Publication Data
US 2017/0223808 A1 Aug. 3, 2017

Related U.S. Application Data

(63) Continuation-in-part of application No. 15/357,900, filed on Nov. 21, 2016, now Pat. No. 10,085,328, (Continued)

(51) Int. Cl.
*H01J 1/60* (2006.01)
*H01J 7/42* (2006.01)
(Continued)

(52) U.S. Cl.
CPC ..... *H05B 37/0272* (2013.01); *H04L 12/2829* (2013.01); *H04L 12/4625* (2013.01);
(Continued)

(58) Field of Classification Search
None
See application file for complete search history.

(56) References Cited

U.S. PATENT DOCUMENTS

| 5,166,887 A | 11/1992 | Farrington et al. |
| 5,283,905 A | 2/1994 | Saadeh |

(Continued)

FOREIGN PATENT DOCUMENTS

| CA | 2236569 | 2/2006 |
| CA | 2249423 | 9/2010 |

(Continued)

OTHER PUBLICATIONS

"Arrow Hart self test GFCI receptacles with audible alarm", Technical Data; EATON; Apr. 2017.
(Continued)

*Primary Examiner* — Anh Q Tran
(74) *Attorney, Agent, or Firm* — Frost Brown Todd LLC; Dennis S. Schell

(57) ABSTRACT

A wireless lighting control system includes a remote server system connected to a wide area network and having software for configuring, monitoring, and controlling lighting fixtures at an installation site. The site includes wireless devices in communication with a gateway via a local wireless network and at least some of the wireless devices are configured to control lighting fixtures, including a configurable user control device, such as a wall dimmer switch, having user interface elements configurable to activate specific lighting effects, such as power, dimming, and scene control. A user computer device is connected to the wide area network and has a graphical user interface enabling virtually mapping of user interface elements to lighting effects. Configuration can advantageously be done without physical access to either the user control device or to the lighting controllers, fixtures, or other devices at the installation site.

29 Claims, 21 Drawing Sheets

Related U.S. Application Data which is a continuation-in-part of application No. 14/823,560, filed on Aug. 11, 2015, now Pat. No. 9,883,567.

(60) Provisional application No. 62/257,908, filed on Nov. 20, 2015, provisional application No. 62/035,558, filed on Aug. 11, 2014.

(51) Int. Cl.

| | | |
|---|---|---|
| *H05B 37/04* | (2006.01) | |
| *H05B 37/02* | (2006.01) | |
| *H05B 33/08* | (2006.01) | |
| *H04L 12/28* | (2006.01) | |
| *H04L 12/46* | (2006.01) | |
| *H04W 24/08* | (2009.01) | |
| *H04L 29/08* | (2006.01) | |
| *H04W 88/16* | (2009.01) | |
| *H04W 12/06* | (2009.01) | |
| *H04W 84/18* | (2009.01) | |
| *H04L 29/06* | (2006.01) | |
| *H04W 12/08* | (2009.01) | |

(52) U.S. Cl.
CPC ......... *H04L 67/125* (2013.01); *H04W 24/08* (2013.01); *H05B 33/0845* (2013.01); *H05B 33/0854* (2013.01); *H05B 37/0218* (2013.01); *H05B 37/0227* (2013.01); *H04L 63/0227* (2013.01); *H04W 12/06* (2013.01); *H04W 12/08* (2013.01); *H04W 84/18* (2013.01); *H04W 88/16* (2013.01); *Y02B 20/445* (2013.01); *Y02B 20/46* (2013.01)

(56) References Cited

U.S. PATENT DOCUMENTS

| | | |
|---|---|---|
| 5,357,361 A | 10/1994 | Nishizawa |
| 5,598,042 A | 1/1997 | Mix et al. |
| 5,623,172 A | 4/1997 | Zaretsky |
| 5,786,644 A | 7/1998 | Zaretsky |
| 5,905,442 A | 5/1999 | Mosebrook et al. |
| 5,909,429 A | 6/1999 | Satyanarayana et al. |
| 5,949,200 A | 9/1999 | Ference et al. |
| 5,982,103 A | 11/1999 | Mosebrook et al. |
| 6,005,759 A | 12/1999 | Hart et al. |
| 6,013,988 A | 1/2000 | Bucks et al. |
| 6,016,038 A | 1/2000 | Mueller et al. |
| 6,094,014 A | 7/2000 | Bucks et al. |
| 6,145,998 A | 11/2000 | Lynch et al. |
| 6,150,774 A | 11/2000 | Mueller et al. |
| 6,147,458 A | 12/2000 | Bucks et al. |
| 6,204,584 B1 | 3/2001 | Muszynski |
| 6,215,102 B1 | 4/2001 | Jones |
| 6,223,029 B1 | 4/2001 | Stenman et al. |
| 6,234,648 B1 | 5/2001 | Borner et al. |
| 6,250,774 B1 | 6/2001 | Begemann et al. |
| 6,252,358 B1 | 6/2001 | Xydis et al. |
| 6,264,329 B1 | 7/2001 | Brooks et al. |
| 6,275,163 B1 | 8/2001 | Bogorad et al. |
| 6,300,727 B1 | 10/2001 | Bryde et al. |
| 6,304,464 B1 | 10/2001 | Jacobs et al. |
| 6,340,864 B1 | 1/2002 | Wacyk |
| 6,388,399 B1 | 5/2002 | Eckel et al. |
| 6,421,214 B1 | 7/2002 | Packard et al. |
| 6,513,949 B1 | 2/2003 | Marshall et al. |
| 6,528,954 B1 | 3/2003 | Lys et al. |
| 6,561,690 B2 | 5/2003 | Balestriero et al. |
| 6,577,512 B2 | 6/2003 | Tripathi et al. |
| 6,580,950 B1 | 6/2003 | Johnson et al. |
| 6,586,890 B2 | 7/2003 | Min et al. |
| 6,617,795 B2 | 9/2003 | Bruning |
| 6,639,769 B2 | 10/2003 | Neiger et al. |
| 6,655,817 B2 | 12/2003 | Devlin et al. |
| 6,692,136 B2 | 2/2004 | Marshall et al. |
| 6,735,619 B1 | 5/2004 | Sawada |
| 6,788,011 B2 | 9/2004 | Mueller et al. |
| 6,798,341 B1 | 9/2004 | Eckel et al. |
| 6,806,659 B1 | 10/2004 | Mueller et al. |
| 6,807,035 B1 | 10/2004 | Baldwin et al. |
| 6,813,720 B2 | 11/2004 | Leblanc |
| 6,831,569 B2 | 12/2004 | Wang et al. |
| 6,844,807 B2 | 1/2005 | Inoue et al. |
| 6,922,022 B2 | 7/2005 | Johannes et al. |
| 6,930,598 B2 | 8/2005 | Weiss |
| 6,940,230 B2 | 9/2005 | Myron et al. |
| 6,950,725 B2 | 9/2005 | Von Kannewurff et al. |
| 6,963,285 B2 | 11/2005 | Fischer et al. |
| 6,967,448 B2 | 11/2005 | Morgan et al. |
| 6,969,954 B2 | 11/2005 | Lys |
| 6,972,525 B2 | 12/2005 | Johannes et al. |
| 6,975,079 B2 | 12/2005 | Lys et al. |
| 6,989,807 B2 | 1/2006 | Chiang |
| 6,990,349 B1 | 1/2006 | Pasternak |
| 6,990,394 B2 | 1/2006 | Pasternak |
| 7,030,572 B2 | 4/2006 | Bernard et al. |
| 7,038,399 B2 | 5/2006 | Lys et al. |
| 7,043,310 B2 | 5/2006 | Polz et al. |
| 7,064,498 B2 | 6/2006 | Dowling et al. |
| 7,069,345 B2 | 6/2006 | Shteyn |
| 7,072,945 B1 | 7/2006 | Nieminen et al. |
| 7,103,511 B2 | 9/2006 | Petite |
| 7,127,228 B2 | 10/2006 | Chang |
| 7,135,824 B2 | 11/2006 | Lys et al. |
| 7,161,311 B2 | 1/2007 | Mueller et al. |
| 7,167,777 B2 | 1/2007 | Budike, Jr. |
| 7,200,660 B2 | 4/2007 | Bruegger et al. |
| 7,202,608 B2 | 4/2007 | Robinson et al. |
| 7,204,622 B2 | 4/2007 | Dowling et al. |
| 7,218,056 B1 | 5/2007 | Harwood |
| 7,221,104 B2 | 5/2007 | Lys et al. |
| 7,231,482 B2 | 6/2007 | Leach |
| 7,233,831 B2 | 6/2007 | Blackwell |
| 7,262,559 B2 | 8/2007 | Tripathi et al. |
| 7,274,160 B2 | 9/2007 | Mueller et al. |
| D552,043 S | 10/2007 | Thursfield |
| 7,292,898 B2 | 11/2007 | Clark et al. |
| 7,310,344 B1 | 12/2007 | Sue |
| 7,327,275 B2 | 2/2008 | Brochu et al. |
| 7,336,670 B1 | 2/2008 | Calhoun et al. |
| 7,345,860 B2 | 3/2008 | Wong |
| 7,348,604 B2 | 3/2008 | Matheson |
| 7,352,138 B2 | 4/2008 | Lys et al. |
| 7,358,679 B2 | 4/2008 | Lys et al. |
| 7,358,681 B2 | 4/2008 | Robinson et al. |
| 7,358,706 B2 | 4/2008 | Lys |
| 7,365,282 B2 | 4/2008 | Altonen et al. |
| 7,410,271 B1 | 8/2008 | Man |
| 7,420,335 B2 | 9/2008 | Robinson et al. |
| 7,436,770 B2 | 10/2008 | Sterne et al. |
| 7,437,150 B1 | 10/2008 | Morelli et al. |
| 7,440,246 B2 | 10/2008 | Bonasia et al. |
| 7,464,035 B2 | 12/2008 | Funk et al. |
| 7,468,958 B2 | 12/2008 | Emery et al. |
| 7,496,627 B2 | 2/2009 | Moorer et al. |
| 7,498,952 B2 | 3/2009 | Newman, Jr. |
| 7,504,821 B2 | 3/2009 | Shuey |
| 7,526,539 B1 | 4/2009 | Hsu |
| 7,530,113 B2 | 5/2009 | Braun |
| 7,532,956 B1 | 5/2009 | Pelaez, Jr. et al. |
| 7,551,071 B2 | 6/2009 | Bennett, III et al. |
| 7,552,325 B2 | 6/2009 | Norton et al. |
| 7,561,554 B2 | 7/2009 | Ling |
| 7,566,155 B2 | 7/2009 | Schug et al. |
| 7,586,420 B2 | 9/2009 | Fischer et al. |
| 7,592,925 B2 | 9/2009 | Nearhoof et al. |
| 7,597,455 B2 | 10/2009 | Smith et al. |
| 7,608,807 B2 | 10/2009 | Hick et al. |
| 7,623,042 B2 | 11/2009 | Huizenga |
| 7,626,339 B2 | 12/2009 | Paton |
| 7,634,555 B1 | 12/2009 | Wainscott, Jr. et al. |
| 7,652,472 B2 | 1/2010 | Kobayashi et al. |

(56) References Cited

U.S. PATENT DOCUMENTS

| | | |
|---|---|---|
| 7,659,673 B2 | 2/2010 | Lys |
| 7,666,010 B2 | 2/2010 | Arenas et al. |
| 7,680,878 B2 | 3/2010 | Tsuchida et al. |
| 7,694,005 B2 | 4/2010 | Reckamp et al. |
| 7,702,421 B2 | 4/2010 | Sullivan et al. |
| 7,712,949 B2 | 5/2010 | Tufano et al. |
| 7,714,699 B2 | 5/2010 | Wessels |
| 7,737,643 B2 | 6/2010 | Lys |
| 7,746,877 B2 | 6/2010 | Trethewey |
| 7,747,781 B2 | 6/2010 | Maurya et al. |
| 7,781,979 B2 | 8/2010 | Lys |
| 7,800,049 B2 | 9/2010 | Bandringa et al. |
| 7,800,498 B2 | 9/2010 | Leonard et al. |
| 7,802,902 B2 | 9/2010 | Moss et al. |
| 7,806,558 B2 | 10/2010 | Williamson |
| 7,849,224 B2 | 12/2010 | Alrabady et al. |
| 7,860,679 B2 | 12/2010 | Rouhier et al. |
| 7,869,168 B2 | 1/2011 | Sullivan |
| 7,911,746 B2 | 3/2011 | Zaretsky et al. |
| 7,924,155 B2 | 4/2011 | Soccoli et al. |
| 7,955,096 B2 | 6/2011 | Arenas et al. |
| 7,966,661 B2 | 6/2011 | Gunawardena |
| 7,969,100 B2 | 6/2011 | Xu et al. |
| 7,983,795 B2 | 7/2011 | Josephson et al. |
| 8,008,802 B2 | 8/2011 | Leonard et al. |
| 8,018,166 B2 | 9/2011 | Soccoli et al. |
| 8,028,045 B2 | 9/2011 | Hofmann et al. |
| 8,047,883 B2 | 11/2011 | Montalbano et al. |
| 8,049,592 B2 | 11/2011 | Wang et al. |
| 8,050,801 B2 | 11/2011 | Richards et al. |
| 8,064,387 B2 | 11/2011 | Jiang et al. |
| 8,064,601 B1 | 11/2011 | Palanisamy et al. |
| 8,072,184 B2 | 12/2011 | Bhade et al. |
| 8,096,818 B2 | 1/2012 | Arenas et al. |
| 8,110,996 B2 | 2/2012 | Budike, Jr. |
| 8,115,626 B2 | 2/2012 | Hick et al. |
| 8,145,360 B2 | 3/2012 | Brundisini et al. |
| 8,159,149 B2 | 4/2012 | Mubaslat et al. |
| 8,209,400 B2 | 6/2012 | Baum et al. |
| 8,212,485 B2 | 7/2012 | Elek et al. |
| 8,220,958 B2 | 7/2012 | Montagne |
| 8,227,731 B2 | 7/2012 | Hick et al. |
| 8,248,203 B2 | 8/2012 | Hanwright et al. |
| 8,248,252 B2 | 8/2012 | Schechter et al. |
| 8,253,340 B2 | 8/2012 | Paton |
| 8,255,090 B2 | 8/2012 | Frader-Thompson et al. |
| 8,258,654 B2 | 9/2012 | Parsons |
| 8,278,838 B2 | 10/2012 | Shen |
| 8,281,010 B2 | 10/2012 | Ansari et al. |
| 8,295,255 B2 | 10/2012 | Nankano |
| 8,295,268 B2 | 10/2012 | Tanaka et al. |
| 8,299,721 B2 | 10/2012 | Smith |
| RE43,828 E | 11/2012 | Tufano et al. |
| 8,310,166 B2 | 11/2012 | Nagaoka |
| 8,312,347 B2 | 11/2012 | Hick et al. |
| 8,335,842 B2 | 12/2012 | Raji et al. |
| 8,371,863 B1 | 2/2013 | Ganta et al. |
| 8,400,321 B2 | 3/2013 | Williams |
| 8,443,071 B2 | 5/2013 | Lu et al. |
| 8,463,453 B2 | 6/2013 | Parsons, Jr. |
| 8,502,660 B2 | 8/2013 | Hick |
| 8,520,512 B2 | 8/2013 | Gilde et al. |
| 8,530,840 B2 | 9/2013 | Carberry et al. |
| 8,602,799 B2 | 12/2013 | Ganta et al. |
| 8,613,624 B2 | 12/2013 | Arenas et al. |
| 8,638,211 B2 | 1/2014 | Cohn |
| 8,653,750 B2 | 2/2014 | Deurenberg et al. |
| 8,667,287 B2 | 3/2014 | Bichsel et al. |
| 8,667,589 B1 | 3/2014 | Saprygin et al. |
| 8,681,463 B2 | 3/2014 | Franks et al. |
| 8,686,738 B2 | 4/2014 | Sexton et al. |
| 8,698,466 B2 | 4/2014 | Vanderzon |
| 8,737,965 B2 | 5/2014 | Mccown et al. |
| 8,796,940 B2 | 8/2014 | Altonen et al. |
| 8,836,476 B2 | 9/2014 | Campbell et al. |
| 8,893,968 B2 | 11/2014 | Jonsson |
| 8,954,170 B2 | 2/2015 | Chemel et al. |
| 9,025,287 B2 | 5/2015 | Privitera et al. |
| 9,055,624 B2 | 6/2015 | Middleton-White et al. |
| 9,099,955 B2 | 8/2015 | Ramirez |
| 9,144,139 B2 | 9/2015 | Joyce et al. |
| 9,177,467 B2 | 11/2015 | Tu |
| 9,192,019 B2 | 11/2015 | Huizenga et al. |
| 9,270,109 B2 | 2/2016 | Dolezilek et al. |
| 9,313,864 B2 | 4/2016 | Setomoto et al. |
| 9,320,101 B2 | 4/2016 | Sun et al. |
| 9,320,121 B2 | 4/2016 | Sun et al. |
| 9,335,750 B2 | 5/2016 | Lu et al. |
| 9,369,116 B2 | 6/2016 | Nederbragt et al. |
| 9,396,504 B2 | 7/2016 | Donde et al. |
| 9,413,772 B2 | 8/2016 | Zeng et al. |
| 9,419,435 B2 | 8/2016 | Testani |
| 9,438,122 B2 | 9/2016 | Mao et al. |
| 9,467,459 B2 | 10/2016 | Chandrasekaran et al. |
| 9,544,798 B1 | 1/2017 | Ahmadzadeh et al. |
| 9,548,977 B2 | 1/2017 | Gabor |
| 9,560,727 B2 | 1/2017 | Reh et al. |
| 9,572,228 B2 | 2/2017 | Hening et al. |
| 9,576,786 B2 | 2/2017 | Greenberg |
| 9,596,716 B2 | 3/2017 | Deng et al. |
| 9,635,740 B2 | 4/2017 | Sun et al. |
| 9,681,299 B2 | 6/2017 | Ram et al. |
| 9,713,235 B2 | 7/2017 | Brochu et al. |
| 9,717,132 B2 | 7/2017 | Sun et al. |
| 9,723,488 B2 | 8/2017 | Atreya et al. |
| 9,730,300 B2 | 8/2017 | Meng et al. |
| 9,749,337 B2 | 8/2017 | Shim et al. |
| 9,769,903 B2 | 9/2017 | Hu et al. |
| 9,772,380 B2 | 9/2017 | Ware et al. |
| 9,801,247 B2 | 10/2017 | Hayashi et al. |
| 9,813,913 B2 | 11/2017 | Cho et al. |
| 9,820,361 B1 | 11/2017 | Turvy, Jr. et al. |
| 9,860,965 B2 | 1/2018 | Recker et al. |
| 9,883,570 B1 | 1/2018 | Turvy, Jr. et al. |
| 2003/0117985 A1 | 6/2003 | Fujii et al. |
| 2004/0010327 A1 | 1/2004 | Terashima et al. |
| 2004/0022186 A1 | 2/2004 | Kump et al. |
| 2004/0023530 A1 | 2/2004 | Garcia |
| 2004/0136358 A1 | 7/2004 | Hind et al. |
| 2004/0143510 A1 | 7/2004 | Haeberle et al. |
| 2004/0263084 A1 | 12/2004 | Mor et al. |
| 2005/0007024 A1 | 1/2005 | Evans et al. |
| 2005/0007031 A1 | 1/2005 | Hyder |
| 2005/0097162 A1 | 5/2005 | Budike, Jr. |
| 2005/0108430 A1 | 5/2005 | Howarth et al. |
| 2005/0259611 A1 | 11/2005 | Bhagwat et al. |
| 2005/0288823 A1* | 12/2005 | Hesse ............... G05B 15/02 700/276 |
| 2006/0044152 A1 | 3/2006 | Wang |
| 2006/0215345 A1 | 9/2006 | Huizenga |
| 2007/0049323 A1 | 3/2007 | Wang et al. |
| 2007/0293208 A1* | 12/2007 | Loh ............... H04L 12/282 455/419 |
| 2008/0007942 A1 | 1/2008 | Ruggles et al. |
| 2008/0042826 A1 | 2/2008 | Hevia et al. |
| 2008/0082637 A1 | 4/2008 | Krainz et al. |
| 2008/0106832 A1 | 5/2008 | Restrepo et al. |
| 2008/0246414 A1 | 10/2008 | Xu et al. |
| 2008/0266050 A1 | 10/2008 | Crouse et al. |
| 2008/0272586 A1 | 11/2008 | Hick et al. |
| 2008/0282182 A1 | 11/2008 | Oosaka |
| 2009/0059603 A1 | 3/2009 | Recker et al. |
| 2009/0103307 A1 | 4/2009 | Shu |
| 2009/0180261 A1 | 7/2009 | Angelides et al. |
| 2009/0235354 A1 | 9/2009 | Gray et al. |
| 2009/0251314 A1 | 10/2009 | Jiang et al. |
| 2009/0261734 A1 | 10/2009 | Newman, Jr. |
| 2009/0278479 A1 | 11/2009 | Planter et al. |
| 2009/0289757 A1 | 11/2009 | Ballard |
| 2009/0309501 A1 | 12/2009 | Catalano et al. |
| 2009/0322231 A1 | 12/2009 | Lobo |
| 2010/0037071 A1 | 2/2010 | Chang |
| 2010/0038440 A1 | 2/2010 | Ersavas |
| 2010/0101924 A1 | 4/2010 | Wu et al. |

(56) References Cited

U.S. PATENT DOCUMENTS

| | | |
|---|---|---|
| 2010/0114334 A1 | 5/2010 | Krumsiek |
| 2010/0122338 A1 | 5/2010 | Kataoka et al. |
| 2010/0237711 A1 | 9/2010 | Parsons |
| 2010/0244709 A1 | 9/2010 | Steiner et al. |
| 2010/0259193 A1 | 10/2010 | Umezawa et al. |
| 2010/0264313 A1 | 10/2010 | Jalbout et al. |
| 2010/0265700 A1 | 10/2010 | Galluccio et al. |
| 2010/0277300 A1 | 11/2010 | Cohn et al. |
| 2010/0277302 A1 | 11/2010 | Cohn et al. |
| 2010/0277306 A1 | 11/2010 | Leinen et al. |
| 2010/0277315 A1 | 11/2010 | Cohn et al. |
| 2010/0318685 A1 | 12/2010 | Kraus et al. |
| 2010/0321929 A1 | 12/2010 | Ramirez et al. |
| 2011/0012434 A1 | 1/2011 | Lee et al. |
| 2011/0012532 A1 | 1/2011 | Barnett et al. |
| 2011/0026510 A1 | 2/2011 | Matsumura et al. |
| 2011/0090042 A1 | 4/2011 | Leonard et al. |
| 2011/0144820 A1 | 6/2011 | Trauer |
| 2011/0147037 A1 | 6/2011 | Tee et al. |
| 2011/0156911 A1 | 6/2011 | Caglianone |
| 2011/0175553 A1 | 7/2011 | Sampsell |
| 2011/0175699 A1 | 7/2011 | Huss et al. |
| 2011/0184577 A1 | 7/2011 | Ilyes |
| 2011/0187273 A1 | 8/2011 | Summerford et al. |
| 2011/0196755 A1 | 8/2011 | Landa |
| 2011/0210684 A1 | 9/2011 | Lanchava et al. |
| 2011/0215736 A1 | 9/2011 | Horbst et al. |
| 2011/0216546 A1 | 9/2011 | Lombardi et al. |
| 2011/0221348 A1 | 9/2011 | Kwag et al. |
| 2011/0248636 A1 | 10/2011 | Liao |
| 2011/0248643 A1 | 10/2011 | Liu et al. |
| 2011/0257766 A1 | 10/2011 | Sundaram et al. |
| 2011/0277001 A1 | 11/2011 | Kaluskar et al. |
| 2011/0278922 A1 | 11/2011 | Leonard et al. |
| 2011/0282509 A1 | 11/2011 | Yegin et al. |
| 2011/0284730 A1 | 11/2011 | Sturdevant |
| 2011/0291586 A1 | 12/2011 | Komagata et al. |
| 2011/0309769 A1 | 12/2011 | Kuroki et al. |
| 2012/0019150 A1 | 1/2012 | Yang et al. |
| 2012/0023552 A1 | 1/2012 | Brown |
| 2012/0038490 A1 | 2/2012 | Verfuerth |
| 2012/0056726 A1 | 3/2012 | Paul |
| 2012/0068611 A1 | 3/2012 | Steiner et al. |
| 2012/0086560 A1 | 4/2012 | Ilyes et al. |
| 2012/0091902 A1 | 4/2012 | Radermacher |
| 2012/0096120 A1 | 4/2012 | Couillabin et al. |
| 2012/0096519 A1 | 4/2012 | Alanara et al. |
| 2012/0112654 A1 | 5/2012 | Choong et al. |
| 2012/0126699 A1 | 5/2012 | Zittel |
| 2012/0136485 A1 | 5/2012 | Weber et al. |
| 2012/0151058 A1 | 6/2012 | Lee |
| 2012/0153867 A1 | 6/2012 | Van Den Biggelaar |
| 2012/0181935 A1 | 7/2012 | Velazquez |
| 2012/0187839 A1 | 7/2012 | Hammel et al. |
| 2012/0198533 A1 | 8/2012 | Thomas et al. |
| 2012/0212140 A1 | 8/2012 | Kim et al. |
| 2012/0219008 A1 | 8/2012 | Lee et al. |
| 2012/0221713 A1 | 8/2012 | Shin |
| 2012/0230698 A1 | 9/2012 | Park et al. |
| 2012/0236554 A1 | 9/2012 | Rust |
| 2012/0248312 A1 | 10/2012 | Soccoli et al. |
| 2012/0256540 A1 | 10/2012 | Batty et al. |
| 2012/0274234 A1 | 11/2012 | Campbell et al. |
| 2012/0274791 A1 | 11/2012 | Thomas et al. |
| 2012/0278640 A1 | 11/2012 | Caglianone |
| 2012/0293013 A1 | 11/2012 | Parsons |
| 2012/0296487 A1 | 11/2012 | Leinen et al. |
| 2012/0299566 A1 | 11/2012 | Hsu |
| 2012/0306621 A1 | 12/2012 | Muthu |
| 2012/0313588 A1 | 12/2012 | Carberry et al. |
| 2013/0010018 A1* | 1/2013 | Economy .............. H04W 76/10 345/691 |
| 2013/0049591 A1 | 2/2013 | Quercia et al. |
| 2013/0132787 A1 | 5/2013 | Hick et al. |
| 2013/0162160 A1 | 6/2013 | Ganton |
| 2013/0181617 A1 | 7/2013 | Maddox |
| 2013/0208382 A1 | 8/2013 | Vanderzon |
| 2013/0214163 A9 | 8/2013 | Soccoli et al. |
| 2013/0229132 A1 | 9/2013 | Fong |
| 2013/0242929 A1 | 9/2013 | Gorgen |
| 2013/0253721 A1 | 9/2013 | Parsons |
| 2013/0271004 A1 | 10/2013 | Min et al. |
| 2013/0279553 A1 | 10/2013 | Hick et al. |
| 2013/0301390 A1 | 11/2013 | Hick |
| 2013/0342687 A1 | 12/2013 | Leinen |
| 2014/0039713 A1 | 2/2014 | Hick et al. |
| 2014/0098247 A1 | 4/2014 | Rao et al. |
| 2014/0130155 A1 | 5/2014 | An et al. |
| 2014/0167621 A1 | 6/2014 | Trott et al. |
| 2014/0233138 A1 | 8/2014 | Gliebe |
| 2014/0269660 A1 | 9/2014 | Dunn et al. |
| 2014/0312802 A1 | 10/2014 | Recker et al. |
| 2015/0061500 A1 | 3/2015 | Yeh |
| 2015/0082429 A1 | 3/2015 | Rangarajan et al. |
| 2015/0085725 A1 | 3/2015 | Estevez et al. |
| 2015/0100166 A1 | 4/2015 | Baynes et al. |
| 2015/0127556 A1 | 5/2015 | Harada |
| 2015/0177948 A1 | 6/2015 | Sasaki et al. |
| 2015/0236643 A1 | 8/2015 | Khan et al. |
| 2015/0296599 A1 | 10/2015 | Recker et al. |
| 2015/0332586 A1* | 11/2015 | Hamm .................. G08C 17/02 340/12.5 |
| 2016/0021723 A1 | 1/2016 | Huizenga et al. |
| 2016/0080391 A1 | 3/2016 | Hasegawa et al. |
| 2016/0085431 A1 | 3/2016 | Kim et al. |
| 2016/0088424 A1 | 3/2016 | Polo |
| 2016/0308686 A1 | 10/2016 | Vijayrao et al. |
| 2017/0025842 A1 | 1/2017 | Peterson |
| 2017/0025892 A1 | 1/2017 | Vanostrand |
| 2017/0163519 A1 | 6/2017 | Bowers et al. |
| 2017/0245351 A1 | 8/2017 | Leinen et al. |
| 2017/0277147 A1 | 9/2017 | De Vaan et al. |
| 2018/0027633 A1 | 1/2018 | Roquemore, III et al. |
| 2018/0059175 A1 | 3/2018 | Hase |

FOREIGN PATENT DOCUMENTS

| | | |
|---|---|---|
| CN | 2325832 | 6/1999 |
| CN | 1119888 | 8/2003 |
| CN | 101155029 | 4/2008 |
| CN | 101226861 | 7/2008 |
| CN | 100414943 | 8/2008 |
| CN | 101867990 | 10/2010 |
| CN | 201655922 | 11/2010 |
| CN | 103458577 | 12/2013 |
| CN | 203368836 | 12/2013 |
| CN | 103561405 | 2/2014 |
| CN | 105722284 | 6/2016 |
| CN | 105899009 | 8/2016 |
| CN | 106949423 | 7/2017 |
| CN | 107094298 | 8/2017 |
| EM | 0890059 | 6/2004 |
| EM | 0870384 | 11/2005 |
| EM | 1371211 | 11/2005 |
| EM | 1535495 | 1/2010 |
| EM | 2474080 | 7/2012 |
| EM | 2595456 | 5/2013 |
| EM | 2725769 | 4/2014 |
| EP | 0923274 | 6/1999 |
| EP | 1832041 | 9/2007 |
| EP | 2549610 | 1/2013 |
| EP | 3022975 | 5/2016 |
| EP | 3070970 | 9/2016 |
| EP | 2485533 | 10/2016 |
| EP | 3282665 | 2/2018 |
| JP | 3892909 | 12/2006 |
| JP | 4141840 | 6/2008 |
| JP | 2009022028 | 1/2009 |
| JP | 4625697 | 11/2010 |
| JP | 2017011907 | 1/2017 |
| KR | 2011022816 | 3/2011 |
| TW | 384583 | 3/2000 |
| WO | 03049379 | 6/2003 |
| WO | 2005018162 | 2/2005 |

(56) References Cited

FOREIGN PATENT DOCUMENTS

| | | |
|---|---|---|
| WO | 2006040364 | 4/2006 |
| WO | 2009098074 | 8/2009 |
| WO | 2009103587 | 8/2009 |
| WO | 2010017588 | 2/2010 |
| WO | 2010039016 | 4/2010 |
| WO | 2010083629 | 7/2010 |
| WO | 2012060679 | 5/2012 |
| WO | 2012109696 | 8/2012 |
| WO | 2012145766 | 10/2012 |
| WO | 2013046849 | 4/2013 |
| WO | 2014081205 | 5/2014 |
| WO | 2013119030 | 8/2015 |
| WO | 2015144231 | 10/2015 |
| WO | 2017069736 | 4/2017 |
| WO | 2017080394 | 5/2017 |
| WO | 2017091047 | 6/2017 |
| WO | 2017099763 | 6/2017 |

OTHER PUBLICATIONS

"Audible Alarm Tamper-Resistant CFCI Receptacle, White", Product page, Legrand.
"CFCI Trip Alarm Text Message System, Cellular Tripped GFCI Alarm, Wireless GFCI Trip Alarm", Product purchasing page, Aqua Technologies Group, 2018.
"Fixture-Integrated Wireless Controls for High Proformance Lighting Management", Acuity Controls, Mar. 2016.
"Luminair 3", SynthFX, Retrieved Apr. 4, 2018.
"Philips Hue Lights", Retrieved Apr. 4, 2018, Philips.
"PowPak Wireless Fixture Control", Lutron; Jan. 20, 2015.
"Universal Dimmer 800W", Clipsal by Schneider Electric; Installation Instructions; Aug. 2013.
"Universal motor speed control and light dimmer with TRIAC and ST7LITE", ST; Oct. 2007; Rev 3.
Aruba, "AirWave 8.2.5", User Guide; Oct. 2017; Rev.01.
Biery, Ethan, "Challenges of Dimming LED Loads on ELV and MLV Transformers", Lutron Electronics; Jun. 2014.
Cisco, "Rogue Management in a Unified Wireless Network", Updated: Aug. 10, 2010.
Sargent, Mikah, "How to control your lights with Amazon Echo", Jan. 20, 2018, Amazon.
Saruhan, Ibrahim Haul, "Detecting and Preventing Rogue Devices on the Network", SANS Institute 2007; InfoSec Reading Room; Accepted Aug. 8, 2007.
Notice of Allowance issued for U.S. Appl. No. 15/492,663 dated Feb. 20, 2018.
Notice of Allowance issued for U.S. Appl. No. 15/620,448 dated Feb. 5, 2018.
Non Final Office Action issued for U.S. Appl. No. 15/357,900 dated Feb. 28, 2018.
Non Final Office Action issued for U.S. Appl. No. 15/621,536 dated Feb. 21, 2018.
Notice of Allowance dated Jul. 16, 2018 in U.S. Appl. No. 15/357,900, filed Nov. 21, 2016.
"Altor Power for Electronics", Altor, Inc., brochure cover page, Natick, MA, circa 1997.
"EyeNut Ingenious Control", Harvard Technology; Retrieved from http://www.harvardtechnology.com/solutions/eyenut.
"LevNet RF Self-Powered Wireless Light Sensor; Self-Powered RF Wireless Light Sensor for use with LevNet RF Receivers", Leviton, Product Data; 2010.
"Smart Choices for Scalable Automation Solutions. Total Control of Your Business from Anywhere", Leviton.
"Wiscape Wireless Street Lighting Controls", HUBBELL.
Dini, et al., "Considerations on Security in ZigBee Networks", University of Pisa, Italy; Jul. 7, 2010.
Farmer, et al., "ZigBee Wikipedia", Retrieved from: https://en.wikipedia.org/wiki/ZigBee?oldid=709776015; Accessed in Mar. 2016.
Inter.Light, Inc., "Light Guide: Occupant Sensors", Retrieved from: http://www.lightsearch.com/resources/lightguides/sensors.html on Nov. 9, 2016.
Kyaw, Zin, Metering International, World Meter Design Congress, Texas Instruments, San Diego, CA; Mar. 2010.
Lee, et al., "A Smart Energy System with Distributed Access Control", Department of Computer Science, National Tsing Hua University, Taiwan, Department of Computer Science, University of California, Irvine, USA.
Masica, Ken, "Recommended Practices Guide for Securing ZigBee Wireless Networks in Process Control System Environments", Control Systems Security Program, Apr. 2007.
Piro, et al., "A standard compliant security framework for IEEE 802.15.4 networks", Politecnico di Bari, Italy, Mar. 6, 2014.
Silicon Laboratories Inc., "UG103.5: Application Development Fundamentals: Security", Rev. 1.0; Accessed on Apr. 20, 2016.
SmartThings, Inc., "Security of SmartThings ecosystem", Accessed on Apr. 20, 2017.
US Dept of Energy, "Wireless Sensors for Lighting Energy Savings", Federal Energy Management Program, Mar. 2016.
Wang, et al., "Design of Smart Home System Based on WiFi Smart Plug", International Journal of Smart Home; vol. 9, No. 6; pp. 173-182; Jun. 2015.
ZigBee Alliance, Inc., "Security and encryption—XBee ZigBee Mesh Kit;", Accessed on Jul. 29, 2016.
ZigBee Alliance, Inc., "Security on the XBee—XBee ZigBee Mesh Kit", May 10, 2017.
ZigBee Alliance, Inc., "ZigBee in a nutshell—XBee ZigBee Mesh Kit", Jul. 10, 2015.
ZigBee Alliance, Inc., "ZigBee Over-the-Air Upgrading Cluster", Revision 18, Version 1.0, San Ramon, CA, Mar. 14, 2010.
ZigBee Alliance, Inc., "ZigBee Security Model—XBee ZigBee Mesh Kit"; May 10, 2017.
ZigBee Alliance, Inc., "ZigBee Smart Energy Standard", Revision 19, Version 1.2a, Dec. 3, 2014.
Zillner, Tobias, "ZigBee Exploited The good, the bad and the ugly", Version 1.0, Vienna, Austria, Aug. 6, 2015.

* cited by examiner

Fig. 13

Device Settings

DEVICE ID  
00:13:A2:00:40:D9:A033

LOCATION  
Confroom - left

ZONE NAME

DEVICE MODE  
| DIMMER | SWITCH | SCENES |

Indicate  Save

Close  Show Advanced

COMMISSIONING A CONFIGURABLE USER CONTROL DEVICE FOR A LIGHTING CONTROL SYSTEM

CROSS-REFERENCE TO RELATED APPLICATIONS

This application is a continuation-in-part of U.S. application Ser. No. 15/357,900, filed Nov. 21, 2016, which claims the benefit of U.S. application Ser. No. 14/823,560, filed Aug. 11, 2015, which claims the benefit of U.S. Provisional Application No. 62/035,558, filed Aug. 11, 2014; and which also claims the benefit of U.S. Provisional Application No. 62/257,908, filed Nov. 20, 2015, the entireties of which are hereby incorporated herein by reference. Any disclaimer that may have occurred during the prosecution of the above-referenced application(s) is hereby expressly rescinded.

COPYRIGHT NOTICE

A portion of the disclosure of this patent document contains material which is subject to copyright protection. The copyright owner has no objection to the facsimile reproduction by anyone of the patent disclosure, as it appears in the United States Patent and Trademark Office patent files or records, but otherwise reserves all copyright rights whatsoever.

FIELD

The present disclosure relates generally to control devices, and more particularly to configurable user controls for wireless lighting control systems.

BACKGROUND

Various devices are known for wirelessly controlling or automating operation of electrical devices. For example, wireless lighting control systems facilitate control and automation of lighting fixtures. That is, various electrical devices may be configured to operate according to predetermined schedules or events, such as in response to time or other user selections and preferences. Remote monitoring or wireless control of certain electrical devices is also offered, including the monitoring or controlling of electrical devices over a network using a mobile device. As the automation and control, including wireless control, of electrical devices becomes more popular and as the desired control becomes more complex, there is a need for robust device control systems that are relatively straightforward to install, configure, and use. Although some relatively sophisticated systems are available, they typically require extensive wiring and other installation steps by technicians specially trained in such systems and are expensive and complex to install and maintain. One such device configuration is user control devices. For example, wireless wall switches. One such prior art wireless wall switch requires the installer to physically access a pairing switch on each of a wireless wall switch and a wireless controller that switches/dims the light fixture to be associated with the wall switch. Such physical access is often not convenient or practical depending on the physical locations of the devices involved.

The present disclosure is directed to one or more of the problems or issues set forth above.

SUMMARY

In one aspect, the present disclosure includes a wireless lighting control system. The wireless lighting control system includes a cloud-based or other remote server system connected to a wide area network and having control software for configuring, monitoring, and controlling lighting fixtures at an organization's installation site. The wireless lighting control system also includes a wireless gateway located at the site and configured to communicate with the remote server via the wide area network. Wireless devices are in communication with the gateway via a local wireless network, for example, a mesh network, and at least some of the wireless devices are configured to control one or more lighting fixtures, including a configurable user control device having user interface elements that are configurable to be associated with an activating specific lighting effects, such as power, dimming, and scene control. A mobile or other user computer device is connected to the wide area network and has a graphical user interface enabling a user to access the server control software to control and configure the lighting fixtures associated with wireless devices at the site according to the user's granted permissions, including virtually mapping user interface elements of user control devices to specific lighting effects. By using a user computer device to configure user control devices, configuration can advantageously be done without physical access to either the user control device or to the lighting controllers, lighting fixtures, or other devices at the installation site to be associated with the user control device.

Installation, commissioning, and configuration of a wireless gateway and wireless devices at the system installation site can be completed by a qualified electrical contractor without requiring training specific to the wireless lighting control system. Additionally, reconfiguration of user control devices can be completed by a user. The site wireless devices can include user control devices such as wall dimmers and touchscreens, occupancy/vacancy and other condition sensors, daylight harvesting sensors, and lighting controllers. A lighting controller may include an actuator and can be configured to switch power on and off, dim, and monitor power and other conditions of a lighting fixture and other lighting devices, for example, a motorized window shade. A controller can also be configured as a trigger that will monitor a non-system device or third-party sensor which is not part of the mesh network and relay data from the device or sensor to the lighting control system. User control devices can be configured to control lighting controllers, for example, associating a user interface element with one or more lighting controllers. User control devices, lighting controllers and certain other wireless devices can also act as a mesh network repeater to extend the area encompassed by the installation site.

Once commissioned, the system enables easy configuration and control of sensing, dimming, automations, schedules, scenes, and monitoring of the site's lighting fixtures and associated devices. One or more light fixtures that will all behave in a like manner form a "zone" and are associated with a single or a common wireless device. An "area" can be formed by a grouping of zones which are configured to respond together to a single event or command, for example, a schedule. A "scene" provides a collection of state change requests, for example, preset saved illumination levels for a zone or area. Monitoring can include real-time and/or archived measurement of status and power consumption reported from wireless devices to the remote server. Control, monitoring, and configuration changes can be easily made by users via a graphical user interface accessible using touchscreen control devices coupled to the wireless mesh network or a user computer device, for example, a mobile device, in communication with the remote server via a wide area network (WAN) such as the internet.

Embodiments of the present disclosure provide improved cloud-based wireless lighting control systems and methods.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

FIG. 13 is an exemplary screen layout of the graphical user interface illustrating the user control device "zone" selection;

FIG. 14 is an exemplary screen layout of the graphical user interface illustrating the user control device settings and "scenes" mode selection of a user control device;

FIG. 16 is an exemplary screen layout of the graphical user interface illustrating the user control device scene selection, with the "All Off" and "All On" scenes selected;

FIG. 18 is an exemplary screen layout of the graphical user interface illustrating the user control device of FIG. 16 allowing a user to configure automations for a user interface element;

FIG. 21 is an exemplary screen layout of the graphical user interface illustrating a touch-enabled user control device "zone" selection;

DETAILED DESCRIPTION OF THE ILLUSTRATED EMBODIMENTS

Figure 1:
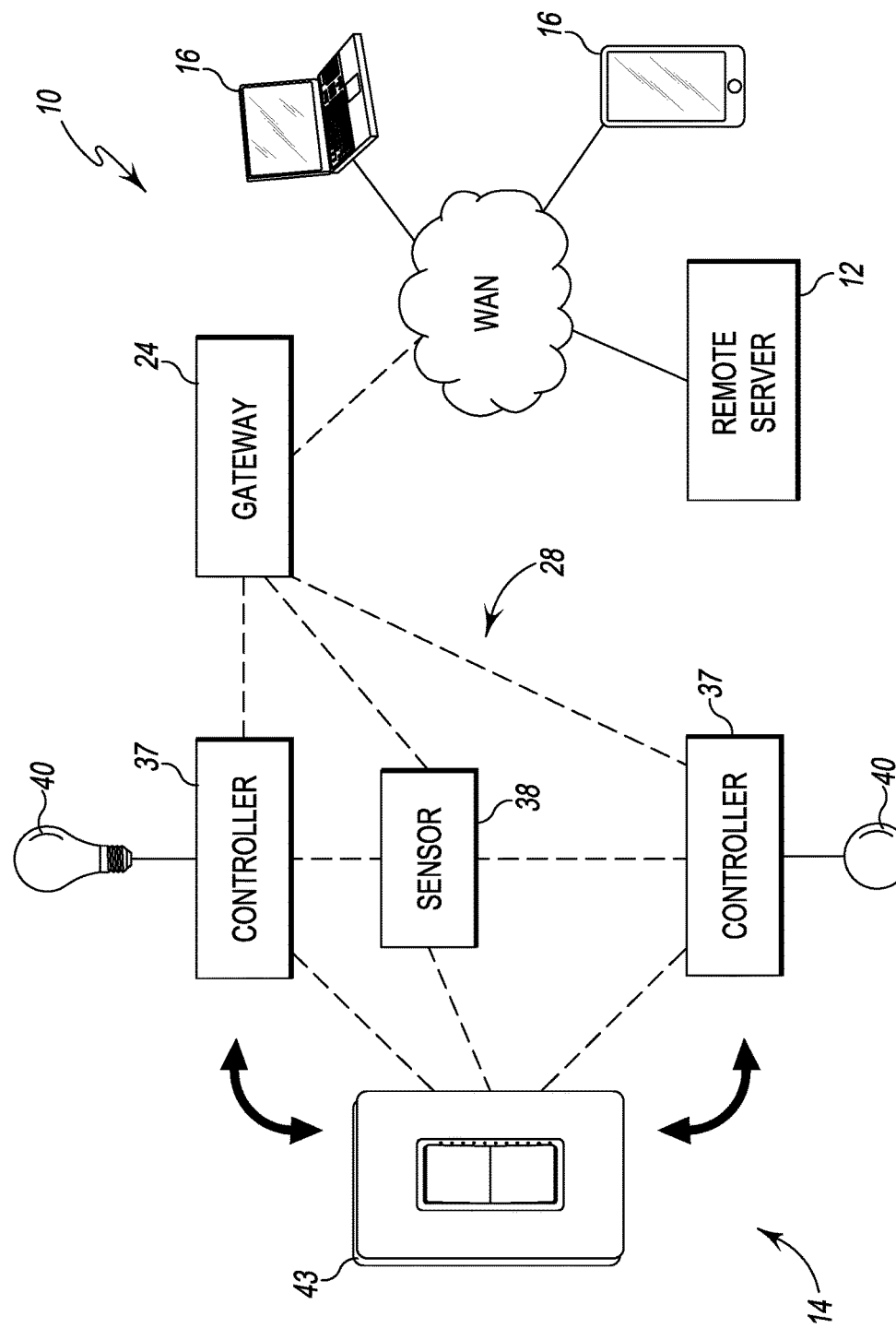
FIG. 1 illustrates an overview of an exemplary wireless device control system, including a user control device according to the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

Likewise, there may be discussion with regards to "objects" associated with some embodiments of the present invention, it is understood that yet other embodiments may not be associated with those same objects, or may include yet different objects. Any advantages, objects, or similar words used herein are not to be construed as limiting to any of the claims. The usage of words indicating preference, such as "preferably," refers to features and aspects that are present in at least one embodiment, but which are optional for some embodiments.

Specific quantities (spatial dimensions, temperatures, pressures, times, force, resistance, current, voltage, power, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

System

FIG. 1 illustrates an overview of an exemplary wireless device control system 10, according to the present disclosure. The exemplary system 10 generally includes a server, or backend system 12, one or more site systems 14, and various clients, also referred to throughout as user computer devices 16. The server system 12 may communicate with the site system 14 and the user computer devices 16 over a wide area network (WAN) such as Internet 20 or a cellular network 22, and/or via a local area network (LAN).

Each site system 14 may generally include at least one gateway, or base station 24, lighting controllers 37, sensors 38, user control devices 43, and a mesh network 28, or other local wireless network, that facilitates communication among site system 14. The gateway 24 serves as the manager/coordinator for site system 14 and mesh network 28, and provides connectivity to server system 12. The lighting controllers 37 may include an actuator providing dimming and/or on/off control for light fixtures 40. User control device 43, such as a touch-screen or wall dimmer, may be associated with one or more controllers 37 to provide user selection of a desired lighting effect, for example, on/off, dimming, and/or scene selection. Sensors, for example, an occupancy sensor 38 or a daylight harvester, can be used to provide automations for the site system 14, including for example, a change to the lighting effect provided by the user control device 43 depending on the state of the sensor 38.

Figure 2:
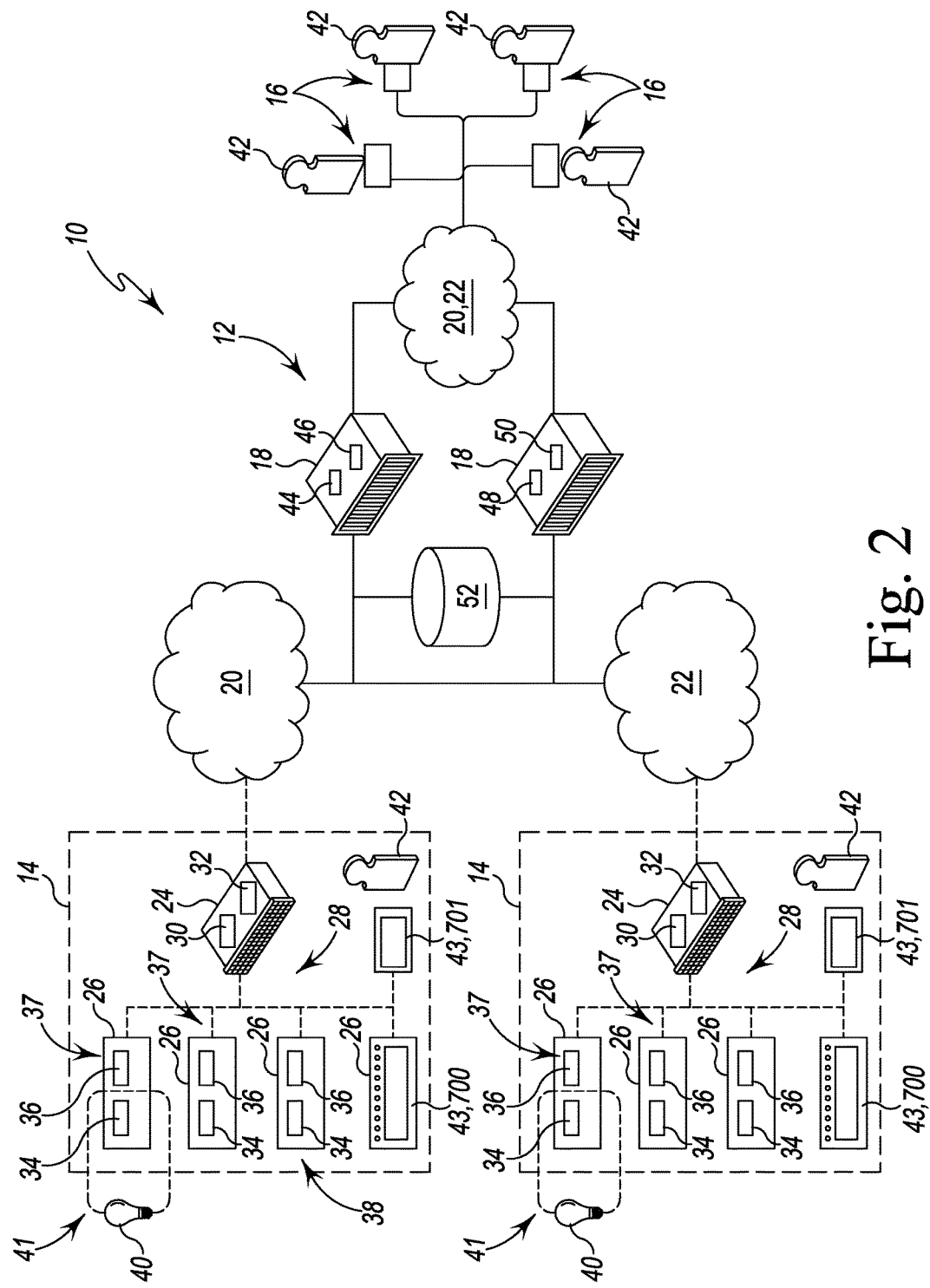
FIG. 2 illustrates an exemplary wireless device control system, according to the present disclosure.

FIG. 2 is a more detailed illustration of an exemplary wireless device control system 10, according to the present disclosure. Although a wireless lighting control system will be described, it should be appreciated that the systems and methods described herein are applicable to the automation, monitoring, and/or control of a variety of devices or components in a variety of environments. Exemplary site systems 14 may include all or portions, including indoor and/or outdoor portions, of a home, business, parking garage, street, worksite, or other location that include a predefined set of components, such as electrical devices or circuits, including, for example, light fixtures, to be monitored or controlled.

The server system 12 may include one or more servers, or computers 18 including typical computer components, such as a processor, memory, storage, display, network interface, and input/output device, for example. The processor, or processors, may execute unique sets of instructions, which may be implemented as computer readable program code, stored in memory or storage, such that the server system 12 is configured as a special purpose system. In particular, hardware, software, and particular sets of instructions may transform the server system 12, or portions thereof, into a lighting control server system, as described herein. As should be appreciated by those skilled in the art, the server system 12 may also include any combination of computer hardware and software that facilitates communication with the site systems 14 and user computer devices 16, and performance of the functions described herein.

According to a specific implementation, all or portions of the server system 12 may be cloud-based virtual servers, including a virtual private cloud-based service. That is, for example, the one or more servers 18 of the server system 12 may reside on the Internet, for example, rather than on a local computer. To be clear, the server system 12 may be remote from the site systems 14 and/or the user computer devices 16. For example, Digi® Device Cloud, offered by Digi® International, Inc., is a public cloud platform for device network management that may be used for all or portions of the server system 12. The server system 12 may communicate with the site systems 14 and the user computer devices 16 over a wide area network (WAN), such as the Internet 20 or a cellular network 22, and/or via a local area network (LAN), for example. Some embodiments in particular use cellular communication. Cellular communication may be quicker to set-up, more secure and/or more reliable than other available communications means, such as an installation site's broadband internet connection. By using a cellular network, embodiments of the present disclosure are able to keep out of the organization's corporate network, which can assist in mitigating accidental creation of back doors through firewalls and into the user's corporate network that could potentially be used to create a security breach in the organization's corporate network.

Each site system 14 may generally include at least one gateway, or base station, 24, and one or more wireless devices 26, or device nodes, which are configured to communicate over a mesh network 28, or other similar local wireless network.

The gateway 24 may include a communications module 30 that facilitates communication between the mesh network 28, or other wireless network, and the WAN network, such as the Internet 20 or a cellular network 22. As such, the gateway 24 can facilitate communication between the devices 26 of the site system 14 and the server system 12. The gateway 24 may also include an operations module 32 for processing and/or communicating instructions (e.g., to devices 26) received from the server system 12, as will be described in greater detail below. The operations module 32 may also receive and/or process information from the devices 26. That is, the gateway 24 may run applications locally while also interfacing across the mesh network 28 for WAN connectivity to the server system 12. An exemplary gateway device may be, for example, the XBee® Zigbee® Gateway provided by Digi® International, Inc, configured as a coordinator.

Each device 26 may include a communications module 34, facilitating communication between the device 26 and the gateway 24 over a local wireless network, such as the mesh network 28. For example, the devices 26 may each include a radio transceiver, such as a XBee® radio module for communicating using the ZigBee® protocol, which is related to IEEE standards, including 802.15.4. The devices 26 may also include at least one control module 36 for facilitating interaction between the device 26 and an associated electrical component, such as, for example, an electrical circuit. Devices 26 may also each be configured to act as a router or end device, such that it can also forward messages to other devices 26 and/or the gateway 24.

Each site 14 may include a variety of different devices 26 managed by the gateway 24 and connected to the mesh network 28. For example, according to one implementation, a site 14 may include lighting controllers 37, sensors, such as occupancy sensors, 38, daylight harvesters, and user control devices, such as touchscreens and wall dimmers, 43. In addition to controlling lighting devices 40, for example, light fixtures, Controllers 37 may additionally or alternatively provide a power usage measurement, and may be configured to act an event trigger by detecting voltage and/or current to determine the state of a device, such as, for example, a room light switch or a light fixture having its own motion sensor, or other sensor, to activate it. Sensors 38 that are part of the system 10 may be configured to detect and report the state of motion sensors, for example occupancy/vacancy sensors, while daylight harvesters may include a light sensing circuit for measuring light and reporting measurements and other data to the system 10.

Each of the user computer devices, or clients, 16 may include a computing device, such as, for example, a personal computer, laptop computer, netbook computer, tablet device, mobile device, portable electronic device (PED), smart device, or cell phone configured to communicate with the server system 12 via WAN 20 or 22, or possibly with the gateway 24, for example, via mesh network 28, to permit a user 42 to configure, monitor, and/or control devices 26 for a particular site system 14. That is, a user 42 may access a control program, or control logic, on the server system 12 through an appropriate user interface, such as a graphical user interface 1000, using user computer device 16, which may have web-browsing abilities or may have a control application installed thereon. For example, upon requesting a Uniform Resource Locator (URL) address corresponding to a website hosted by the server system 12, a web page may be loaded in a web browser of one of the client devices 16. That is, one of the servers 18 may be or may include a web server for delivering web content to the user 42 through one of the user computer devices 16 described above. Thereafter, the user 42 may be provided with an option of registering for or accessing an account.

The system 10 or, more specifically, the server system 12 may include a plurality of modules useful in carrying out the control and other strategies disclosed herein. For example, the server system 12 may include or utilize functionality expressed with reference to an organization account registration module 44, a user manager module 46, a device manager module 48, and a communications module 50, to name a few. It should be appreciated that the term "modules," as used herein, is for ease of explanation, rather than limitation, and is intended to represent certain related aspects or functionality of the wireless device control system 10. Each of the modules may represent a set of computer instructions, or computer readable program code, representing processes for performing specific tasks of the wireless device control system 10. The tasks may be performed using a processor, or processors, and may require the access or manipulation of data stored in a data repository 52.

The account registration module 44, which will be discussed in greater detail below, may facilitate the creation of accounts for organizations and/or users, such as users 42, within the system 10. For example, the registration module 44 may be used to collect data input by users 42 and/or authorized administrators and/or customer service representatives accessing the wireless device control system 10 through one of various user computer devices 16. According to some embodiments, the various user computer devices 16 may include any suitable electronic communication devices and/or workstations, such as, for example, personal computers, laptop computers, netbook computers, tablet devices, mobile devices, PEDs, smart devices, and cell phones, as mentioned above. The account registration module 44 may be used to collect various information, including, for example, personally identifiable information, such as, for example, name, address, and phone number.

The user manager module 46 may include and/or implement rules pertaining to the various users 42, or user types, of the system 10. For example, when one of the users 42 is registered, a user profile including user credentials, such as a username and password, may be created for the user 42 and stored in the data repository 52. The user manager module 46 may be configured to ensure that each user 42, as identified using the unique credentials, is provided with appropriate access and/or capabilities with regard to the system 10, as will be discussed in greater detail below. For example, the user manager module 46 may include an association of each user 42 to one or more sites, and may define appropriate permissions for each user 42 relative to respective organization and/or respective site systems 14.

The wireless device control system 10 or, more specifically, the server system 12 may include a database management system including one or more databases, such as data repository 52. The data repository 52 may store data, including the account and user data described above and installation and configuration data for site system 14, useful in carrying out the strategies disclosed herein. Although the data repository 52 is illustrated as a component within the server system 12, it should be appreciated that the server system 12 may include any number of separate components or systems, including separate database(s), configured to communicate with one another in a manner consistent with the teachings disclosed herein.

The device manager module 48 may provide the main functionality of the server system 12. For example, after account registration is completed and appropriate organizations and/or users are established in the system 10, the device manager module 48 may be programmed and/or configured to permit users 42 to remotely control and manage specific associated site systems 14. The device manager module 48 may also monitor and process data from the data repository 52, and/or acquired data, to facilitate identification configuration, monitoring, and control of the site systems 14, as will be described below. According to a specific example, the device manager module 48 may receive control information from users 42 via user computer devices 16, store the information in the data repository 52, and mirror the information to the appropriate gateway 24 for implementation. According to some embodiments, the data repository 52 may be initially populated with at least some default control data.

Devices

As stated above, devices 26 of the wireless control system 10 and associated site lighting fixtures 40 may be controlled, monitored, and managed by users 42, via user computer devices 16 and user control devices 43. Generally speaking, devices 26 can act as actuators, causing changes in the environment (e.g., turning lights on or off), user controls, detecting and responding to user interactions, and/or sensors, detecting and/or responding to some input from the environment, such as movement or light, at the respective sites. Although not an exhaustive list, some exemplary devices 26 are described further below and can include user control devices 43, occupancy/vacancy and other condition sensors 38, daylight harvesting sensors, and lighting controllers 37. Standard color coding of wires is used in some embodiments to facilitate ease of installation by electrical technicians.

User Control Devices

Figure 10:
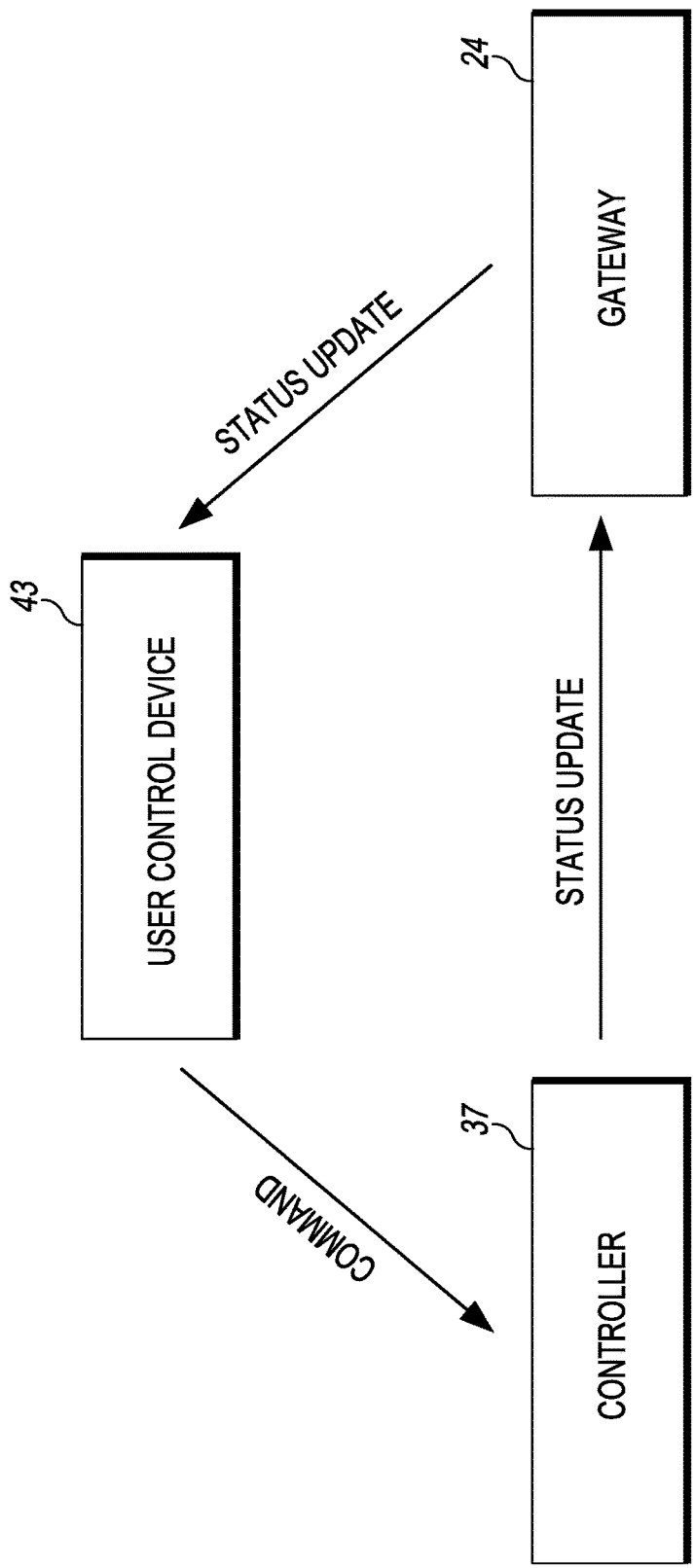
FIG. 10 is an exemplary communication flow for device-to-device control in the site system of the wireless device control system of the present disclosure.

Referring to FIGS. 1 and 10, exemplary user control devices 43, e.g. mechanical and touch-activated interfaces such as wall dimmer switches and touchscreens, reside at the site 14, for example, mounted to or recessed within a wall at a convenient location for the areas and zones controlled by the device. The user control device 43 may communicate directly with and control the devices 26 of the site system 14 via the mesh network 28, or communicate with the gateway 24. For example, lighting effects such as on/off or dimming control of one or more controllers 37 associated with a user control device 43 may utilize transmission of messages by device 43 addressed to specific controllers 37. Alternatively, lighting effects such as scene control may utilize transmission of a messages by device 43 addressed to the gateway 24 indicating the user interaction with device 43 and/or the desired scene, resulting in gateway 24 initiating control of appropriate controllers 37. Directly communicating through the mesh network 28 in addressing the devices 26 will reduce latency that might otherwise occur if the user 42 is accessing the devices 26 through the WAN 20 or 22 and through the gateway 24, as described above.

As such, the user control device 43 may additionally include a radio module 746 (FIG. 3), such as an XBee® radio module, for example, XBP24CZ7 available from Digi International of Minnetonka, Minn., for communicating using the ZigBee® protocol, as described above, and may serve as a repeater for the mesh network 28. The user control device 43 may include an integrated radio module, or may include an external radio module. If configuration or control of one or more devices 26 is affected from the user control device 43, the gateway 24 and ultimately the server system 12 and the user interface on a user computer device 16 may be updated accordingly with the new configuration and/or status of the devices 26, either by the user control device 43 or by the devices 26 themselves.

Figure 6:
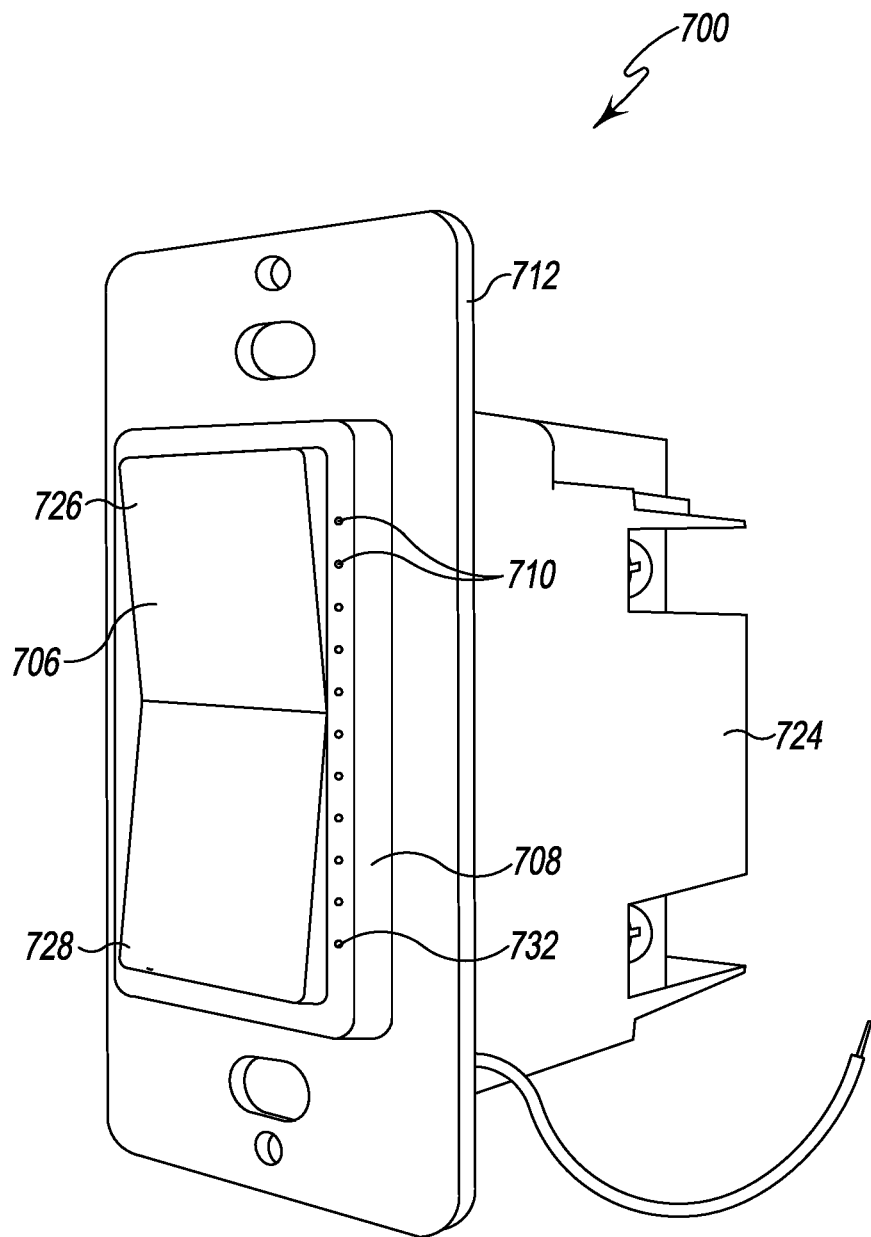
FIG. 6 is a perspective view of an exemplary embodiment of a user control device for use with the wireless device control system of FIG. 1.
Figure 7:
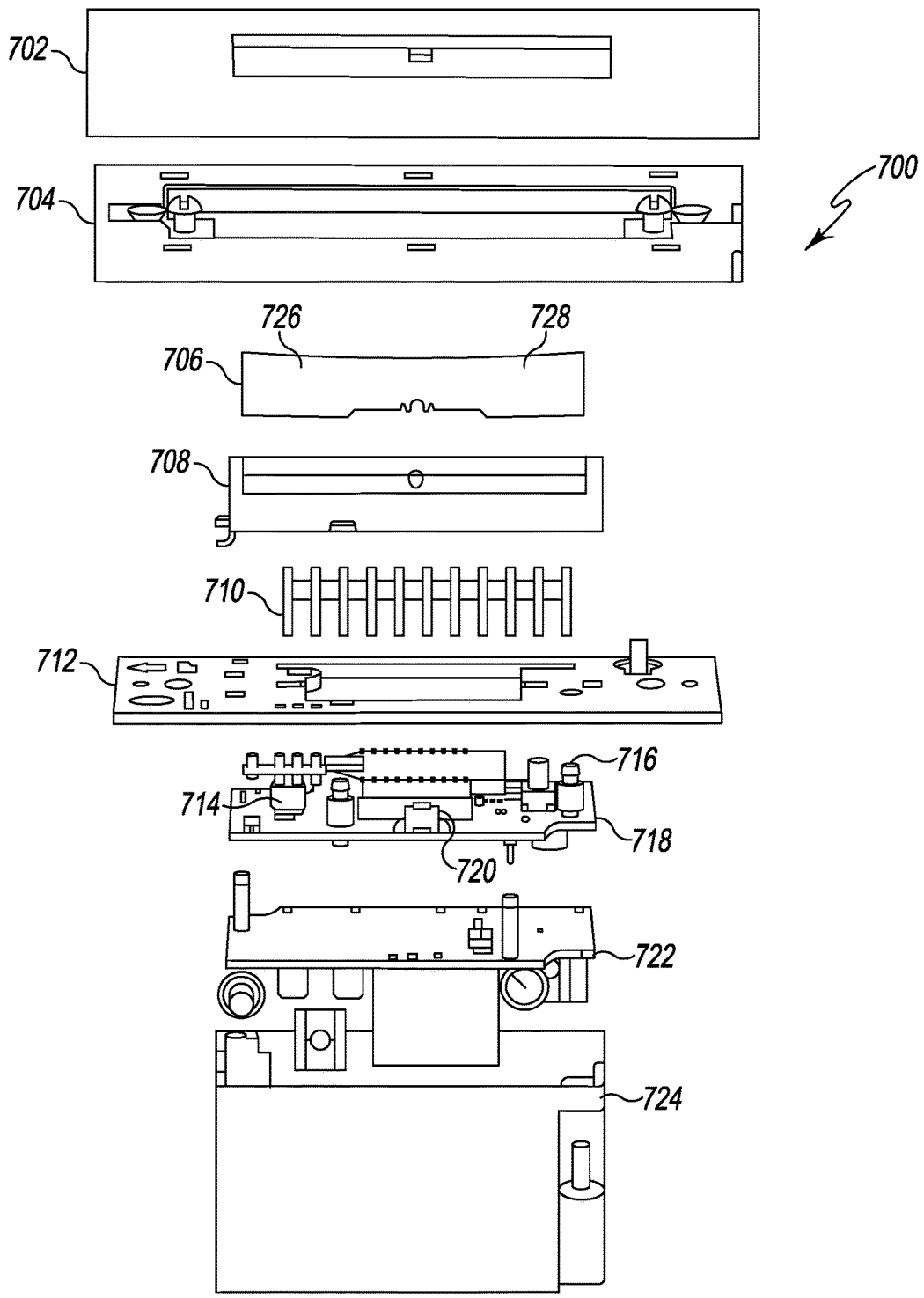
FIG. 7 is an exploded view of the user control device of FIG. 6.

Referring to FIGS. 6 and 7, one embodiment of a user control device 43 is a dimmer switch 700. The dimmer switch 700 may include a rocker switch 706 with two programmable user interface (e.g. pressure or mechanically activated) elements, 726 and 728. Although two user interface elements are shown and described, it should be appreciated that a dimmer switch 700 and other forms of user control devices 43 may include more or less than two user interface elements and the additional design characteristics described herein are not intended to be limiting. The illustrated embodiment of the exemplary dimmer switch 700, as shown in FIG. 7, includes a housing/enclosure 724 which can be recessed in a wall-mounted electrical box similar to a common household single-gang light switch. The mounting plate 712 and faceplate bracket 704 secure the dimmer switch 700 to the wall surface or electrical box and are covered by the faceplate 702. Within the exemplary dimmer switch 700, the main electrical components providing the functionality of the dimmer switch 700 are the control board 718, to provide a processor 740 and the functions of the radio module 746 as described above, and the power supply board 722, including for example an AC/DC power supply module 750. Processor 740 may be, for example, an MSP430 microcontroller available from Texas Instruments of Dallas, Tex. The dimmer switch 700 may also include external memory, for example CAT24C128 I2C serial EEPROM available from ON Semiconductor of Phoenix, Ariz., to provide additional memory, including, for example, to provide a rollback copy of firmware during firmware updates of the dimmer switch.

Figure 4:
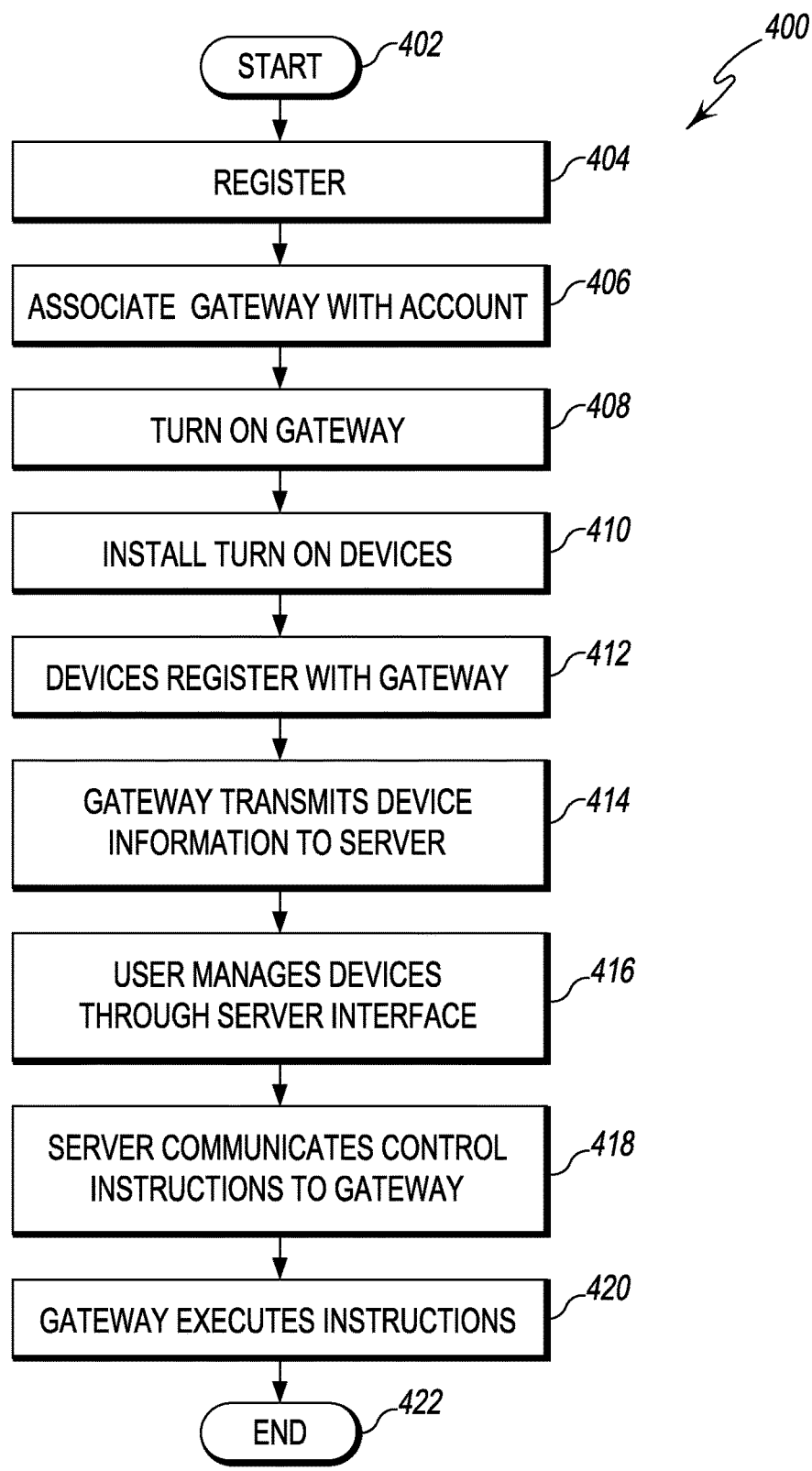
FIG. 4 is a flowchart representing an exemplary method for commissioning a site system of the exemplary wireless device control system of FIGS. 1 and 2.
Figure 5:
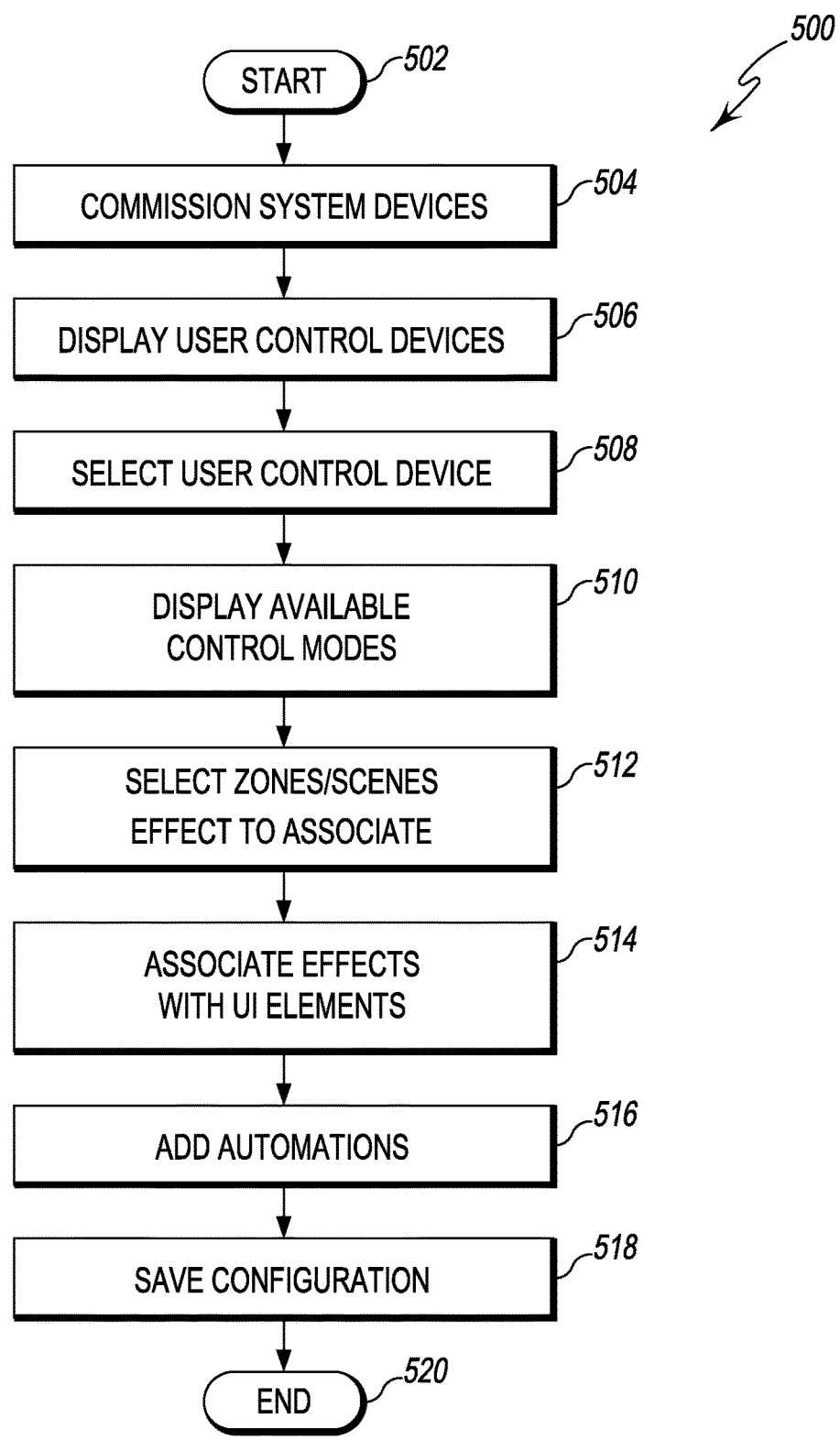
FIG. 5 is a flowchart representing an exemplary method for configuring a user control device of the exemplary wireless device control system of FIG. 1.

According to exemplary functionality, the rocker switch 706 may be configured to perform various different functions depending on the user interaction with the rocker switch, for example, the length and/or number of times a user interface element 726 or 728 is depressed. For example, the dimmer switch 700 may be configured such that pressing one user interface element, for example, upper element 726, closes momentary contact switch 714 (FIGS. 3 and 7), while pressing the second user interface element for example, lower element 728, closes a second momentary contact switch 716. In another configuration, while similarly pressing the elements once may toggle the connected circuit both ON/OFF, pressing the same user interface elements two or more times within a predetermined amount of time, or pressing and holding the element may initiate a different lighting effect of the same or a different lighting controller 37, for example, dimming one or more lighting devices 40 up or down for the duration the element is pressed. Other configurations of the user interface elements may include, but are not limited to, initiating certain behaviors associated with schedules, automations, or scenes for individual devices 26 or groupings of devices within specific areas and zones. These various combinations of lighting effects and/or behaviors can be programmed, or virtually mapped, by a user 42 through a user computer device 16, or more specifically through the graphical user interface 1000 (e.g., FIG. 11) of the user computer device 16. The process of commissioning and virtually mapping user control devices 43 is illustrated in FIGS. 4 and 5 and is described in greater detail below.

As shown in FIGS. 6-9, the exemplary dimmer switch 700 may include several LEDs 710, 730, 732, and 734 providing indications of various features. One or more LED drivers may be used to interface the LEDs with MCU 740, for example, TLC59208F I2C Bus LED drivers available from Texas Instruments of Dallas, Tex. Dimming LEDs 710 (FIGS. 3 and 6) which can be seen by a user illuminating from the rocker frame 708, for example, via optical pipes 711, will illuminate based upon the configuration of the dimmer switch 700, user actuation of the rocker 706, and optionally, confirmation of the status of the desired control via controller 37 and/or gateway 24. In this embodiment, the upper ten LEDs 710 along the right side of rocker switch 706 are green LEDs and have variable illumination patterns which are generally representative of the mode and status of the dimmer switch 700 and/or user actuation of the rocker 706. A power/indicator LED 732 is a white LED located at the bottom right and indicates the device 43 is powered and can also provide other indications, for example, flashing, upon selection of the device 43 for self-indication, for example, by user 42 via graphical user interface 1000.

Figure 8:
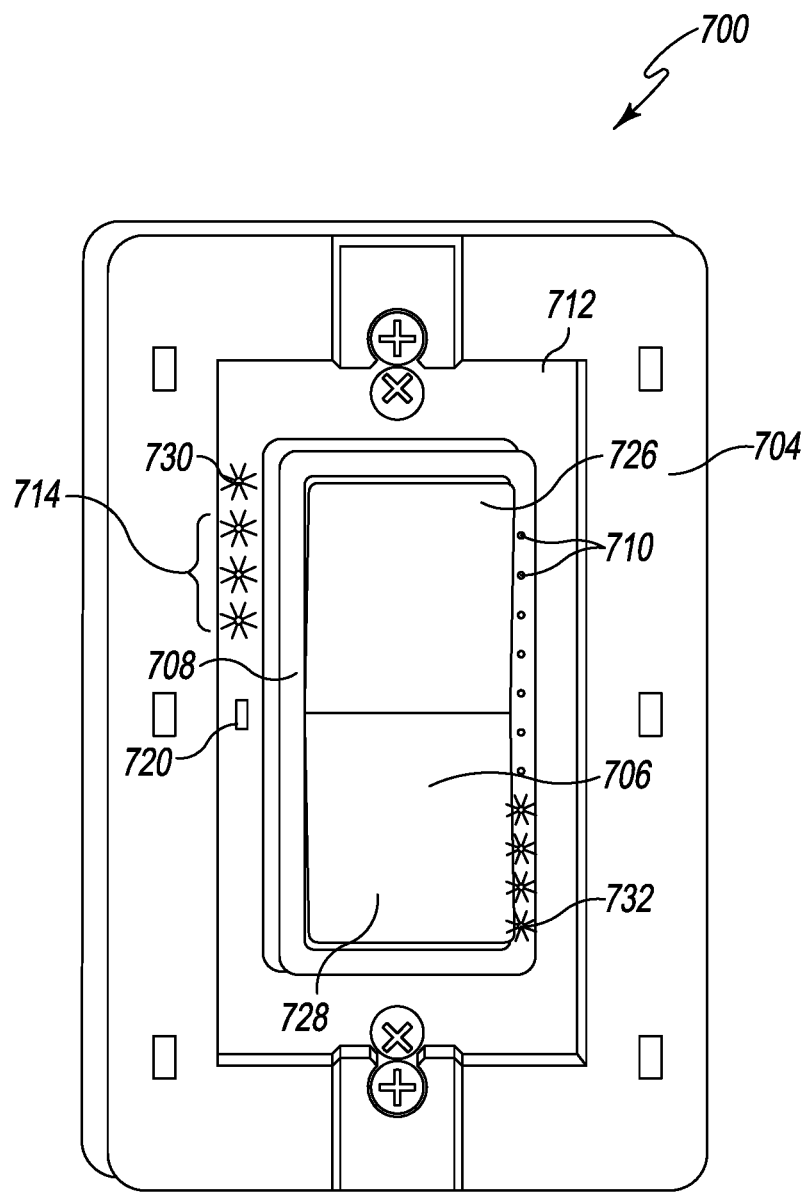
FIG. 8 is a perspective view illustrating installation of the user control device of FIG. 6 configured for dimming control.

As a first example of the configurable control functionality of dimmer switch 700 and varying illumination patterns of the dimming LEDs 710, when using the dimmer switch in a dimmer mode, the ten variable dimming LEDs 710 will illuminate such that a user is able to view the contemporaneous dim level. As a user increases the power level from 0% to 100%, for example, by pressing and holding the upper user interface element 726, one additional dimming LED will illuminate from the lower end of the dimmer switch 700 upward for each power increase of 10% until all ten dimming LEDs 710 are illuminating once the power level reaches 100%. FIG. 8 illustrates a dimmer switch 700 being operated in dimming mode wherein the power level is 30%, wherein the lowest three of the variable dimming LEDs 710 are illuminated. Additional examples of configurable or nonconfigurable control functionality associated with various user interactions with user control elements that may be incorporated into dimmer switch 700 include: touch and release of the bottom element 728 turns off and stores the prior dim level setting; when off, touch and release of the top element 726 turns on and restores the dim level to the stored dim level; double tap of the top element 726 or bottom element 728 sets the dim level to the maximum or minimum, respectively; and press and hold of the top element 726 or bottom element 728 slowly increases or decreases the dim level until released.

Figure 9:
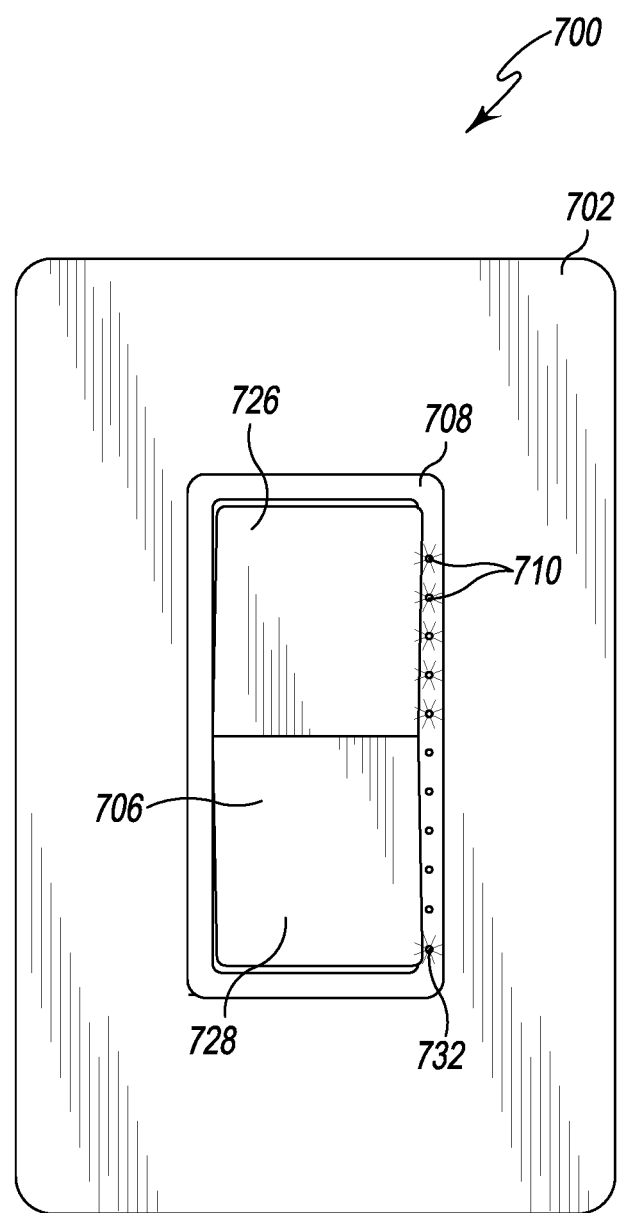
FIG. 9 is a perspective view illustrating the user control device of FIG. 6 as installed and configured for scene selection.

As a second example of the configurable control functionality of dimmer switch 700 and varying illumination patterns of the dimming LEDs 710, the ten variable dimmer LEDs 710 may illuminate differently when the dimmer switch 700 is operated in scene selection mode. More specifically, when the upper user interface element 726 is pressed, the five upper dimmer LEDs 710 may illuminate continuously or for a predefined period of time before turning back off indicating selection of a scene associated with the upper element 726. Alternatively, when the bottom user interface element 728 is pressed, the five lower dimmer LEDs 710 may illuminate continuously or for a predefined period of time before turning back off. FIG. 9 illustrates a dimmer switch 700 being operated in scene selection mode wherein the upper interface element 726 has been pressed. Additionally or alternatively, one or more of the user interface elements 726 and 728 may be used to selectively index through and select from a series of different scenes, for example, several different scenes, providing selection from among more scenes than there are elements associated with the dimmer switch 700.

As a third example of the configurable control functionality of the dimmer switch 700 or other user control devices 43, the device may be selectively configured to control both the power/dim settings for one or more control devices 37 AND scene control selection. For example, use of a particular user interactions with a user control element, use of a particular user control elements, or satisfaction of conditions for a particular automations (discussed further below) could be used to distinguish between power/dim control and scene control selection.

Figure 3:
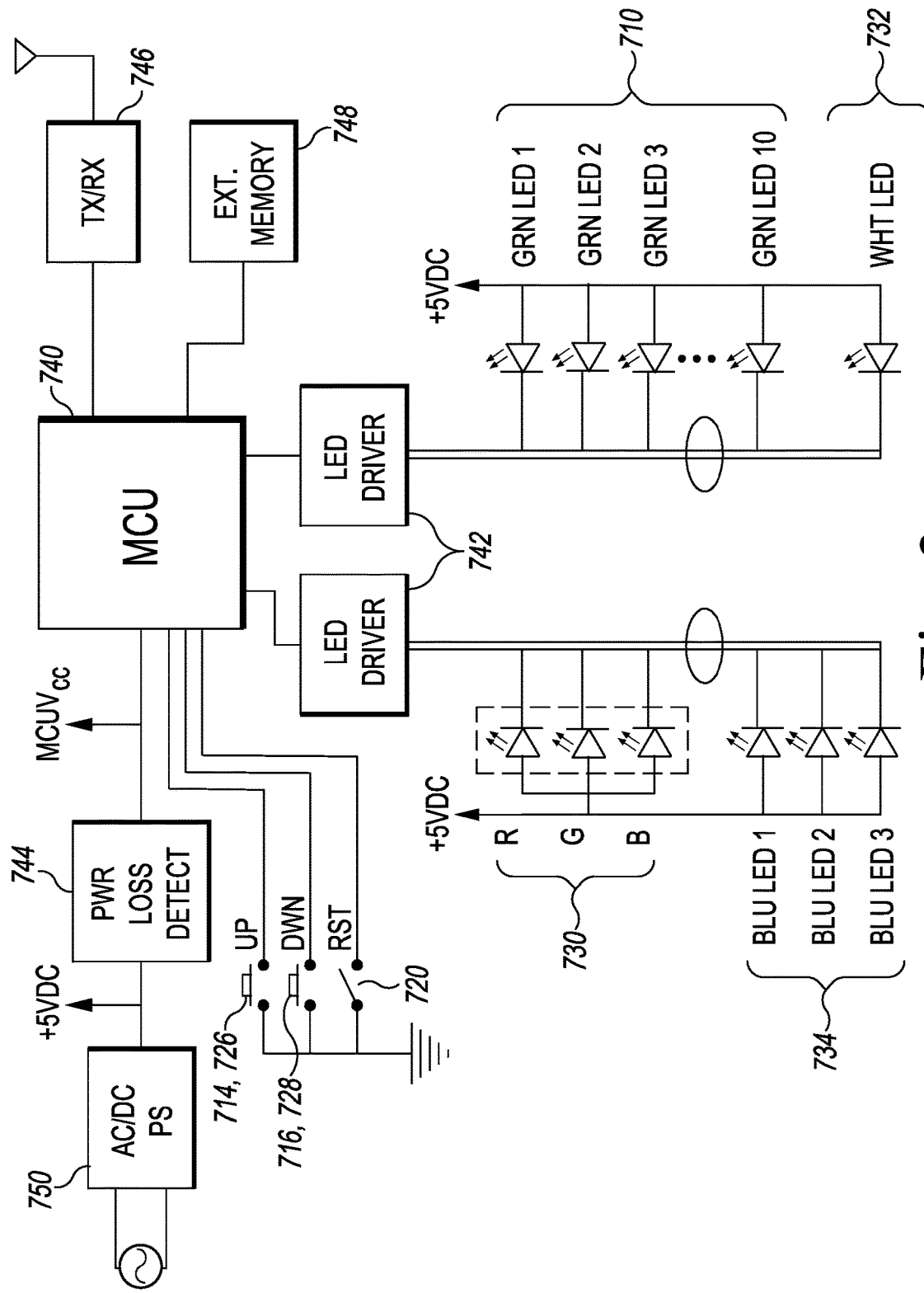
FIG. 3 is a schematic block diagram of an exemplary user control device.

With reference to FIGS. 3 and 8, the exemplary dimmer switch may also include a network connectivity status indicator 730 and plurality of network signal LEDs 734 which can be seen by a user during installation and hidden during subsequent use. In the exemplary embodiment, the network signal LEDs 734 are blue LEDs located on the control board 718 and are covered by the faceplate 702 upon completion of installation. The plurality of network LEDs 734 may be provided to function as a signal strength indicator, providing a visual indication of signal strength to, for example, the nearest device 26 in the mesh network 28. For example, three illuminated LEDs may represent strong signal strength, two illuminated LEDs may represent acceptable signal strength, and one illuminated LED may represent unacceptable signal strength. It should be appreciated that the particular means for accomplishing this manual functionality and the particular visual indications described are for exemplary purposes only; variations may be implemented without deviating from the scope of the present disclosure. The network connectivity status indicator 730 may include a multicolor LED. For example, illumination of a green LED may indicate device 43 is joined with mesh network 28, for example, also registered with and recognized by gateway 24. A red LED of status indicator 730 may indicate the device 43 is not joined with mesh network 28.

Figure 19:
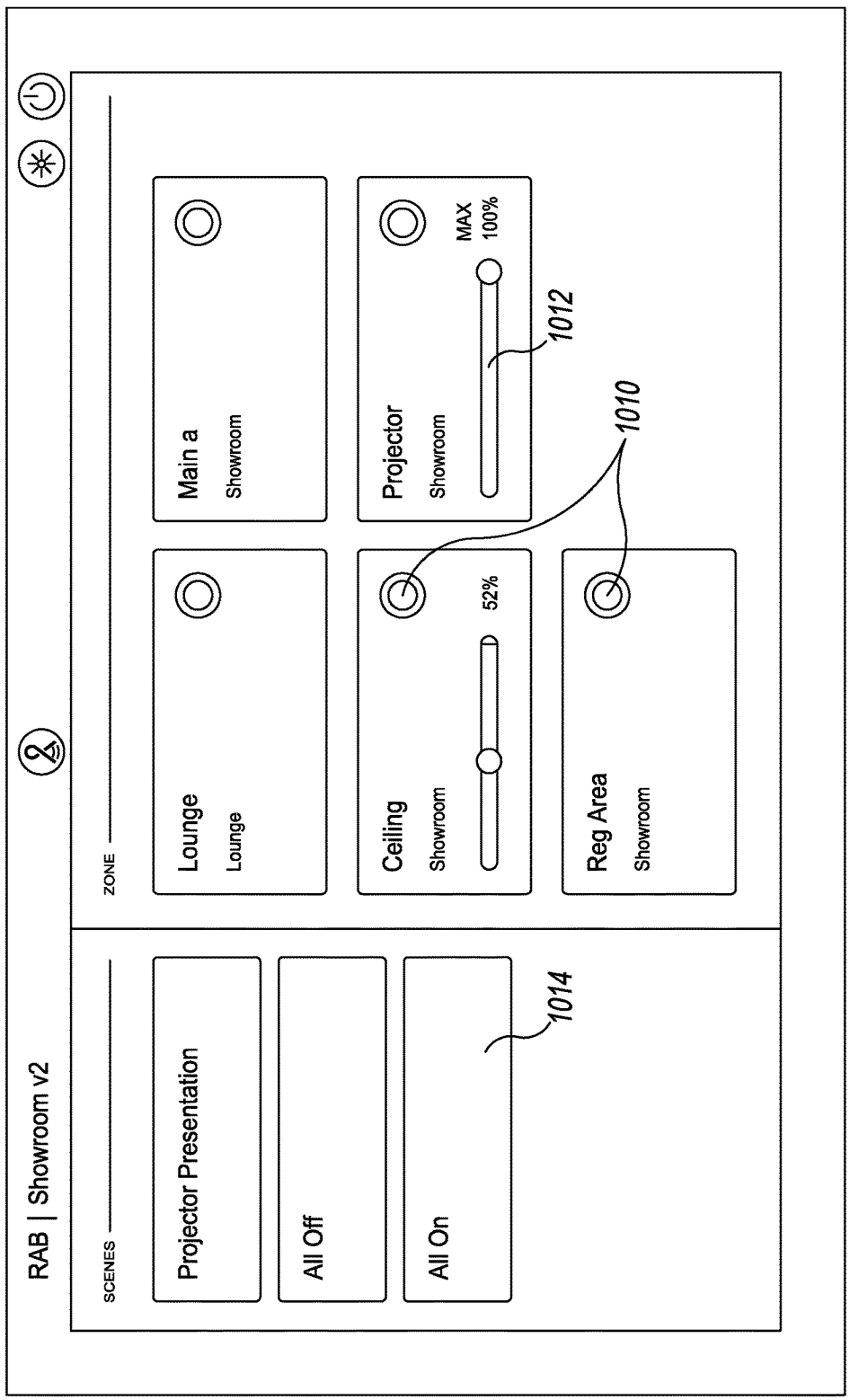
FIG. 19 is an exemplary screen layout of an alternative touch-enable embodiment of a user control device including graphical user interface elements.

Another embodiment of a user control device 43 is a touchscreen device 701 (FIG. 2), such as a tablet computing device, that functions like one of the user computer devices 16, having a user interface application or software installed directly thereon, facilitating the system configuring, monitoring, and controlling as described herein, for example, the exemplary user interface screen as shown in FIG. 19 that provides configurable touch-activated user interface elements 1010, 1012, and 1014.

The touchscreen control device 701 may include other radio modules, as tablet computing devices typically do, that are disabled to limit communication to the mesh network, which increases security of the wireless device control system 10. Since the mesh network 28 is the only wireless communications available to the user control device 43, a problem arises in how to install and updating software for the device, and, in particular, the user interface application. Advantageously, a user interface application can be deployed to the user control device 43 via server 12, WAN 20 or 22, gateway 24, and mesh network 28.

Lighting Controllers

An exemplary lighting controller 37, or lighting control device, may switch mains power to circuits, such as, for example, circuit 41 of FIG. 2, as well as provide a dimming interface for dimmable drivers and ballasts. As an example, the controller 37 may provide a 0-10V dimming interface. The remotely controlled controller device 37 may, thus, provide ON/OFF control, as well as dimming, for light fixtures installed on the same circuit. As used herein, "mains power" broadly refers to power delivered to a site or location, such as a house or building, from a utility company, and power distributed throughout the site or location, such as from a circuit breaker to a number of branch circuits, for example, 120 VAC power.

Power Loss Detection

According to some embodiments, devices 26, including controllers 37, user control devices 43, and occupancy sensors 130, may be configured to provide a power loss message/notification. For example, these devices 26 are configured to, upon detection of the loss of mains power, send a packet to the gateway 24 indicating such. To do so, capacitive circuits of the devices 26 maintain sufficient power to send this last message to the gateway 24, indicating power loss. For example, the dimmer switch 700 power loss detection circuit 744 can provide such detection and sufficient capacitive storage to provide momentary power for the processor 740 and the radio module 746 to send a power loss message. If the gateway 24 does not receive this message, it can be presumed that any loss of communication from the device 26 is due to a loss of reception rather than a loss of power.

AC power loss can be detected by the power loss detection circuit 744 in various ways known in the art, including in two illustrative ways. First, AC power loss is detected by monitoring zero voltage crossing of the AC supply power of the device 26. The processor receives the AC power line and signals through the power monitor at the AC input pins and enable the processor to measure instantaneous AC voltage. The processor triggers an AC power loss notification upon an absence of zero crossings detected over a specified period of time, for example, two or more zero voltage crossings during the period of time expected for 60Hz AC power, for example about 20 msec.

The second way AC power loss is detected or confirmed is by determining that DC voltage at a first DC voltage output is lost. The device 26 processor can include an input/output port coupled to the first DC voltage output to monitor whether the voltage level at a junction between a first DC stage and a second DC stage reflects that AC power is provided (if the first DC voltage level is detected) or if AC power is lost (if a lower and/or declining DC voltage level is detected). To aid the detection of power loss at the first DC voltage output, a capacitor is coupled across the node between the output and the anode of the diode and ground. Upon loss of AC power, the capacitor will discharge through the associated resistive voltage divider, which also provides a voltage detection level across the capacitor that is scaled appropriately for the port of the processor. To aid the speed with which power loss can be detected by the process via the port, it has been found advantageous to set the port as an output port, set the output low, for example, for a few milliseconds, then set the port to input in order to catch the rising side of the port threshold rapidly if the voltage across the capacitor is already low. In contrast, if the port is always an output and the capacitor is discharging, it can take about 100 milliseconds or longer to detect a low voltage state at the descending side of the port threshold.

An additional feature is an optional power supply split of the controller circuitry powered by the second DC stage so that upon detection of power loss, power can be disconnected from part of the controller circuit and power from a capacitive supply can continue to power only the portion of the control circuitry needed to transmit a power loss data message.

Gateway

At least one gateway, such as gateway 24 above, is installed to communicate with devices 26 at a site 14. With continued reference to the system 10 of FIG. 2, the gateway 24 serves as the coordinator of and manages the mesh network 28 and communicates with the server system 12. As will be described below, the gateway 24 ultimately controls the devices 26, with control information mirrored from the server system 12, with which users 42 and user computer devices 16 directly interact.

According to at least one embodiment of the present disclosure, the gateway 24 communicates with the server system 12 via cellular or, in some particular embodiments, machine-to-machine cellular. As such, the gateway 24 may be provided with a subscriber identity module (SIM) card for facilitating communication over a cellular network, for example, private, encrypted 3G cellular connection independent of any site networks. This connection may be maintained while the gateway 24 is powered on, and, by avoiding the use of an Ethernet, WiFi, or other shared internet connection, may be more secure than alternative communications means, also avoiding providing a possible inadvertent intrusion pathway through a firewall of the site 14.

Embodiments for packet routing through mesh network 28 include ad hoc network routing where the shortest path from a device 26 to the gateway 24 is continually updated and used for communications. Still other embodiments utilize source routing where a routing path from a device 26 to the gateway is initially set and remains unchanged until the routing path is updated at a later (typically predetermined) time. Still other embodiments will utilize ad hoc routing when there are a particular number of nodes in the mesh network 28 (e.g., 40 or less) and will utilize source routing when there are a different number of nodes in the mesh network (e.g., >40 nodes).

Illumination Protocols

Referring to FIG. 10, other embodiments of the present disclosure can address illumination latency issues by using a point-to-point (device-to-device) control scheme in which packets containing commands are sent directly from one device 26 to another device 26, rather than having to route through the gateway 24, which may sometimes result in appreciable and undesirable delays between user control interaction and changes in lighting effects in the site 14. For example, a user control device 43 associated with the mesh network 28 provides instructions in a messaged addressed directly to the controller 37 for the light fixture 40. The user control device 43 will send the command (e.g., on, off and/or dim) packet directly to the controllers 37 for the light fixtures, i.e., bypassing the gateway 24, then each controller 37 can send a response to the gateway 24 and the/or the user control device 43 to inform the gateway that the command was received and/or a change in status of the controller (or light fixture) had occurred. Other devices such as occupancy sensors 130 and controllers 37 that are configured in site system 14 to control another device 26 can similarly employ point-to-point packet routing and control.

Deployment Plan

The process of deployment and commissioning of system 10 is illustrated in process 400 of FIG. 4 and is as described further below. In embodiments where the gateway 24 communicates via a cellular network, the gateway 24 is typically installed at a location having a good cellular signal. The devices 26 are also typically installed such that they communicate with the gateway 24, either directly or indirectly (such as through other devices 26 of the wireless mesh network 28). With the devices 26 powered on, the installer can ensure that the devices have a "good" signal indication to ensure good communication with gateway 24, for example, using the indicators 714 and 730 on the dimmer switch 700. If the signal is unacceptable, the devices 26 may be relocated or additional devices may be added between the particular device 26 and the gateway 24.

Commissioning

Once the hardware has been mounted and powered on, it may be commissioned, during which the device enters the network and is identified by the server system 12. In at least one embodiment, the devices being mounted and powered on will self-commission, greatly simplifying installation. For example, in at least one example embodiment, the gateway 24 self-commissions by automatically identifying itself to the device control system 10 and with a user organization account.

Once one or more items of hardware of site system 14 (e.g., gateway 24, any device 26, sensors 38 and/or any user control device 43) is mounted (or positioned) in the appropriate location and powered on, such hardware will self-commission by automatically initiating communications with the server system 12 (which for a device 26 will typically do so by communicating and registering with the gateway 24 which in turn registers the device with server system 12) and identifying itself to the server system 12, which may occur over a cellular telephone network as previously described.

When the devices 26 are powered on, they can wirelessly and automatically attempt to communicate with the gateway 24 via the mesh network 28. In particular, the devices 26 can identify themselves to the gateway 24 and the gateway 24 can inform the server system 12 of the devices 26 (see, e.g., step 414 of FIG. 4). According to some embodiments, a proprietary link key may be used to secure communications between the gateway 24 and devices 26, even during initial commissioning.

Once the hardware of site system 14 has been installed, the hardware can be associated with a user organization account for the device control system 10, which may be accomplished automatically, such as if an account has already been established, or by an administrator of the server system 12.

Embodiments including hardware that self-commission greatly enhances the usability of these systems. The user need only power on the hardware (typically after mounting and wiring with the light fixtures 40) to have the hardware communicate with the server system 12 and have the server system 12 identify which specific device self-commissioned. As such, no special training may be required, other than potentially having an electrician's certification depending on local laws, to have one or more devices fully integrated into the network and into an operational system. In situations where the user does not have a user organization account, the self-commissioning process speeds the installation process. In some embodiments, a user without an organization account can have an account established and have the device (e.g., a wireless dimmer switch 700) fully integrated into the network within minutes (e.g., less than 1 minute in some embodiments, and less than 5 minutes in other embodiments).

If registration has not yet occurred, it can occur at this point in the process. To reiterate, the gateway 24 may be associated with an account, such as, for example, by a user or administrator accessing or creating an account over the Internet. Alternatively, a user may call a customer service representative to assist in establishing a user account and/or the commissioning process. Yet alternatively, an interactive voice response system may be integrated with the device control system 10 to assist in the registration and/or commissioning process. Ultimately, a gateway identification code for the gateway 24 is typically associated with a particular organization account and site, such as site system 14.

A flowchart 400 representing an exemplary method of commissioning and/or configuring a site, such as site system 14, is shown in FIG. 4. The method begins at a START, step 402, and proceeds to a first step, shown at step 404, in which registration occurs. In particular, a user, such as one of users 42, may access the server system 12 using an appropriate interface, such as a web-based or native application, to register and/or create an organization account and add users and/or administrators. Alternatively, an administrator may register users 42 and create user accounts. After registration, a gateway, such as gateway 24, may be associated with an organization account, at step 406. This may be accomplished by entering a unique gateway identification number through the application, or other appropriate interface, or the gateway 24 may be pre-configured with an association to an existing account.

With the association in place, when the gateway 24 is powered on, at step 408, the gateway 24 may appear on a user interface, such as a graphical user interface 1000, of a user device, such as one of the user computer devices 16. Devices 26 may be designed such that upon power up they automatically attempt to register with the gateway 24 after they are powered on, at steps 410 and 412. That is, when a device 26 such as a user control device 43 is powered on, it wirelessly and automatically attempts to communicate with the gateway 24. In particular, the device 26 identifies itself to the gateway 24 and the gateway 24 informs the server system 12 of the device 26, at step 414. In some embodiments, the gateway 24 may prevent new devices 26 from using the proprietary link key to join the mesh network 28 unless a customer service representative and/or organization administrator has set the site system 14 and gateway 24 to allow new devices to join, for example, by selecting an "add devices mode" on the graphical user interface 1000.

After devices 26 have joined the mesh network and registered with gateway 24 and server system 12, the user 42 may then be able to manage devices 16 through the user interface, at step 416, as will be discussed below for flowchart 500 for the user control devices 43. Users 42 may have various levels of access and control with regard to a particular site and/or particular device 26. After configuration, the server system 12 communicates control instructions to the gateway 24, at step 418, and the gateway 24 may execute the instructions, at step 420. Updates provided by the user 42 may be forwarded from the server system 12 to the gateway 24. In addition, the gateway 24 may receive various information from the device 26, and may send, or relay, various updates to the server system 12. Ultimately, the method proceeds to an END, at step 422.

After the device 26 communicates with the gateway 24 and the gateway 24 communicates information about the device 26 to the server system 12, the device 26 may be managed within a user interface as provided by a user computer device 16. That is, with continued reference to FIGS. 1-2, representations, such as, for example, graphical and/or textual representations, of the device 26 may be displayed on a graphical user interface 1000 of one of the user computer devices 16, as shown for example in FIGS. 11-21. Additionally, when a user 42, particularly an organizational administrator, logs into their account, all sites, or site systems 14, associated with the user 42 may be visible through the user interface.

Figure 11:
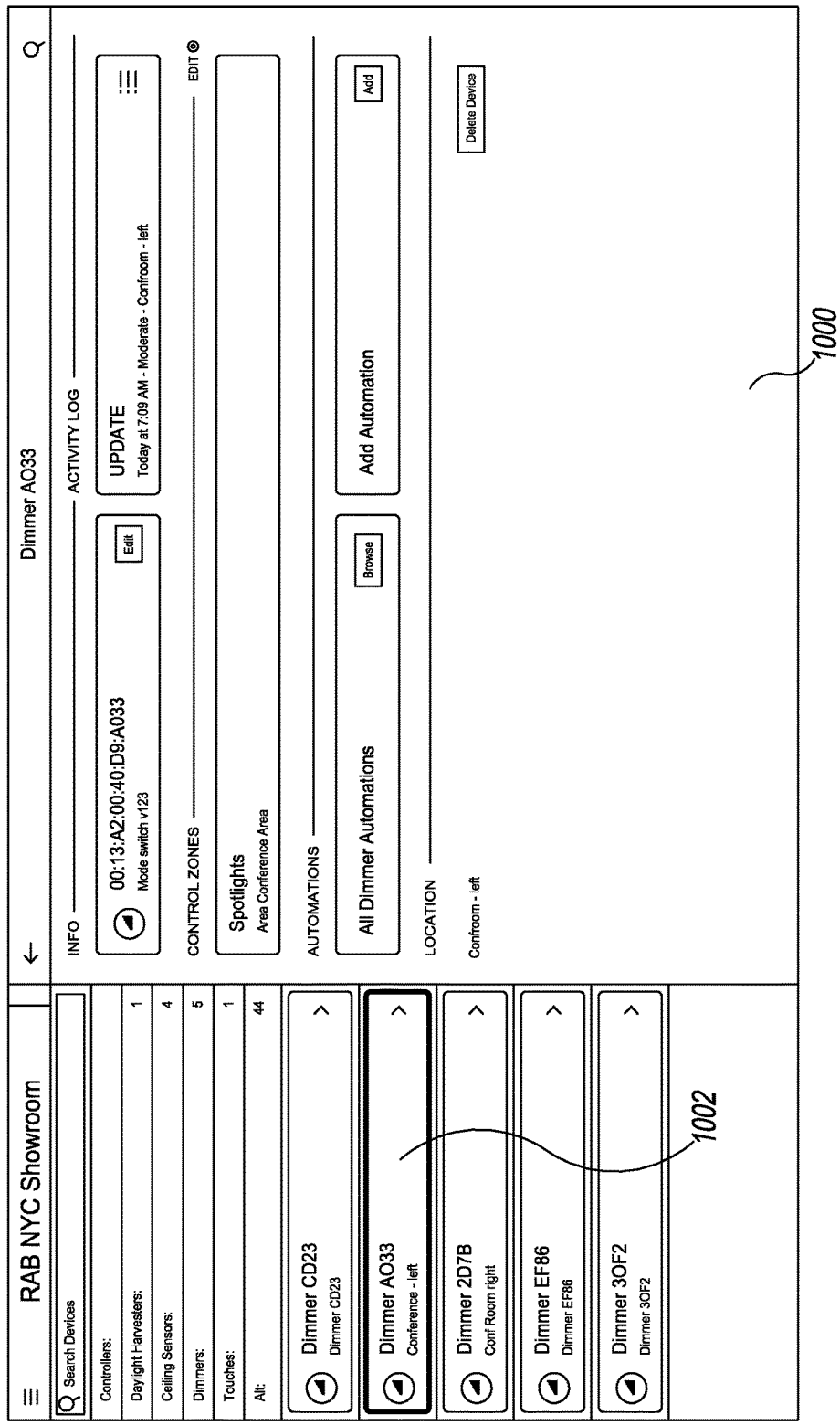
FIG. 11 is an exemplary screen layout of the graphical user interface illustrating a list of connected user control devices and a selection of a user control device for configuring.
Figure 12:
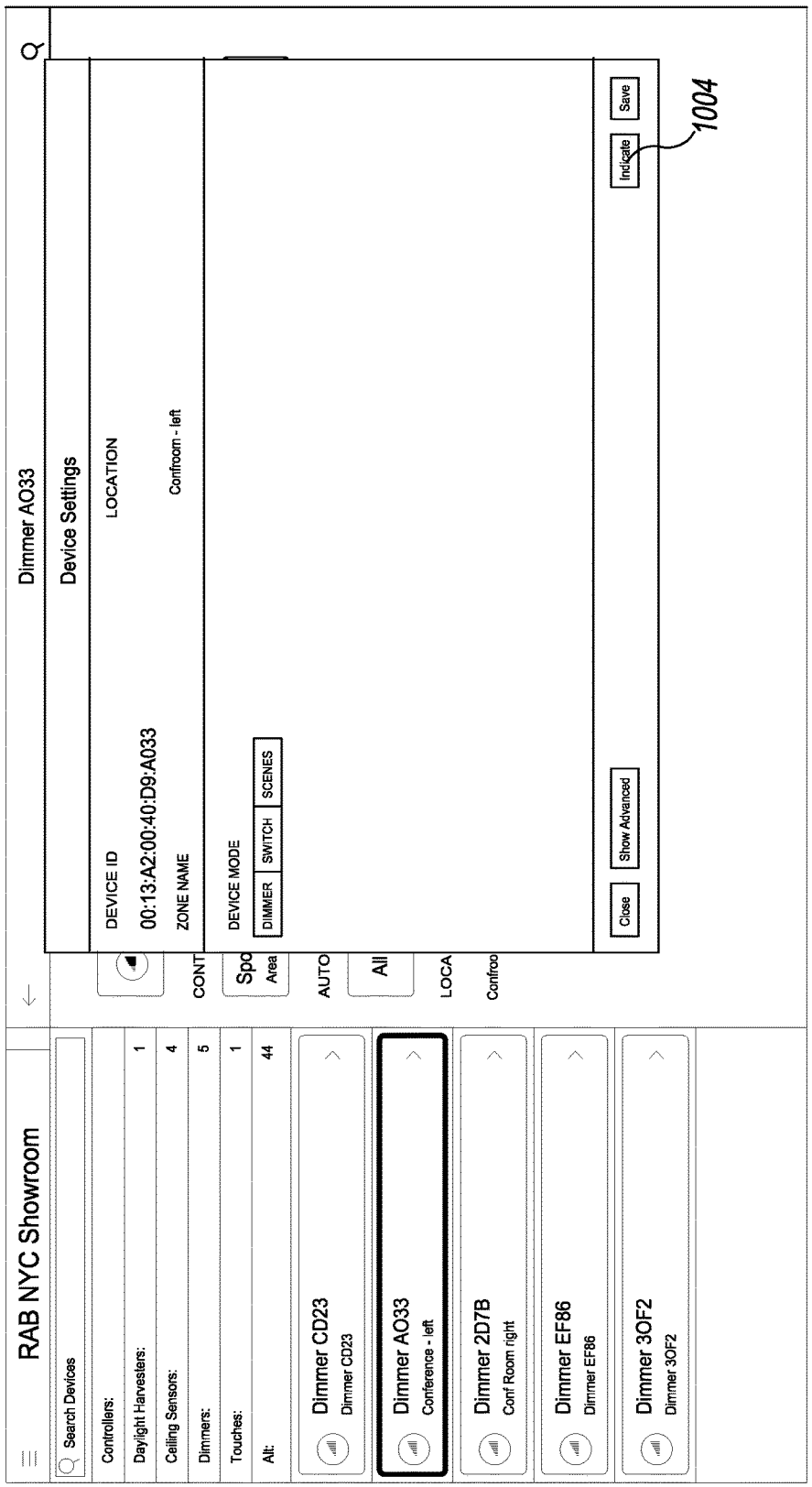
FIG. 12 is an exemplary screen layout of the graphical user interface illustrating the user control device settings and "switch" mode selection of a user control device.

Referring again to FIGS. 11-21, when the user 42 selects one of the sites, or site systems 14, entries 1002 representative of actual devices 26 are visible through the user interface and include information, such as unique device identifiers. The user 42 may enter additional information about each device 26, such as a device location, description, and zone, using the user interface. To ascertain which entry 1002 in the graphical user interface 1000 represents which physical device 26, a user input, such as an indicate selection button 1004 associated with a specific one of the entries 1002 displayed on the graphical user interface 1000 may be actuated, as illustrated in FIG. 12. As a result, an indicator on the physical device 26 represented by that entry 1002 may be modified in some predetermined way to assist the user 42 in matching each entry 1002 to the physical device 26 it represents. For example, an indicator, such as the power indicator LED 732 (FIG. 8) of the dimmer switch 700, may illuminate using a predetermined duration and/or pattern, or the load (e.g. light fixture 40) controlled by the device may be repeatedly switched on/off or dimmed/undimmed.

An additional and/or alternative device identification may include the user 42 actuating a physical switch or pushbutton, such as pushbutton 720 (FIG. 8) of the exemplary dimmer switch 700, of one of the devices 26. This actuation may generate a communication sent by the radio module 746 (FIG. 3) of the dimmer switch 700 and be received by the gateway 24 of the site system 14 and communicated, along with the unique device identifier of the selected device 26, e.g. of the dimmer switch 700, to the server system 12. In addition, this actuation my change a state of a status indicator on the device 26, for example, one or more LEDs may blink for a period of time or other condition satisfied subsequent to a physical switch being actuated. An example of this function is the status indicator LED 730 of the exemplary dimmer switch 700. In response to this device identification procedure, the device entries 1002 as shown in FIG. 11, or other representation, in the user interface may be changed to identify which device entry 1002 corresponds to the selected device 26. For example, the particular device entry 1002 corresponding to the selected device 26 may be moved up to the top of the list, highlighted, or otherwise indicated, and may be pre-selected in preparation for the user 42 to continue the commissioning process. As such, the user 42 may be assisted in adding useful and accurate information about the device 26 via the graphical user interface 1000.

Configuration and Use

When the site system 14 is deployed and the devices 26 are properly commissioned, the user 42 may begin remotely managing and controlling the devices 26, for example, by initiating manual actions through a graphical user interface 1000 or creating automations and schedules to be carried out by the server system 12 and/or gateway 24. As described above, users 42 may have various levels of access and control with regard to a particular site 14 and/or particular devices 26. After commissioning, the server system 12 communicates control instructions to the gateway 24 (and/or devices 26 via gateway 24), and the gateway 24 (and/or devices 26) may execute the instructions. Updates provided by the user 42 may be forwarded from the server system 12 to the gateway 24, and to devices 26. In addition, the gateway 24 may receive information from the devices 26, and may send, or relay, various updates to the server system 12.

As described above, the devices 26 may accomplish some function, such as detecting changes in the environment or causing changes in the environment. That is, for example, some devices 26 may switch power to a lighting fixture and/or control a dim level of the lighting fixture(s). According to some embodiments, a trim level, representing a maximum illumination level of the lighting fixture, may be set or modified through the graphical user interface 1000. For example, as an energy savings feature, a user may set a trim level for a particular light by lowering the maximum illumination level for the light so that a user may not increase the illumination level/output beyond the newly selected maximum level. In addition to a maximum dim level, a minimum dim level may be set and/or adjusted through the application user interface. As another example, the device 26 (e.g., an occupancy sensor) can restrict the maximum illumination of the fixture when the sensor detects a person, e.g., when the light is turned on the light illuminates to only 80% of its maximum illumination. Although illumination can be less than 100% when using trim levels, the wall switch can be configured to indicate the fixture is at 100% illumination while the user interface (cell phone, iPad, etc.) can show the actual illumination level (e.g., 80%).

Figure 13:
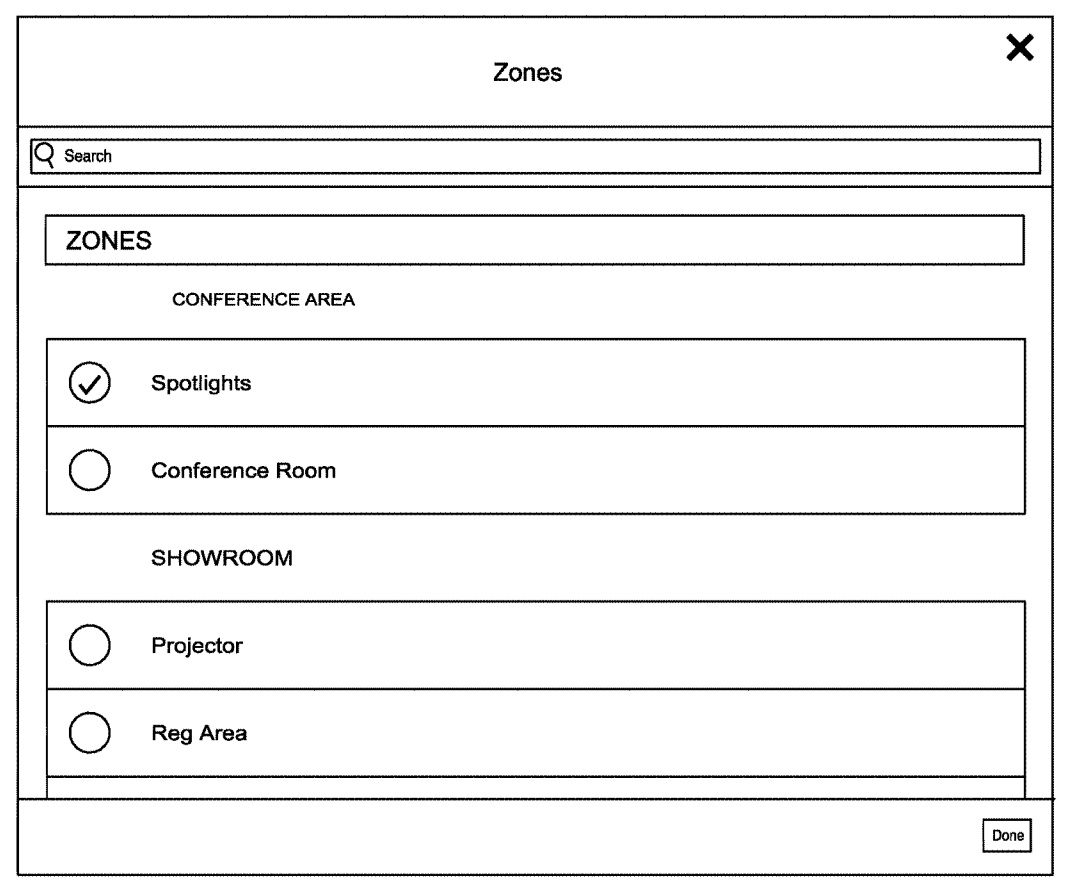

During commissioning, or sometime thereafter, each of the devices 26 may be associated with or may correspond to a particular zone. For example, a zone may represent an electrical circuit having one or more lighting fixtures installed thereon. Zones may be grouped into areas, which may represent, for example, rooms, locations, or other designated areas of the site 14. This organization may logically group circuits into common areas to facilitate appropriate monitoring and control. Turning to FIG. 13, a screen layout depicts the creation of an area and selection of zones to group within the area via an exemplary user interface.

Figure 15:
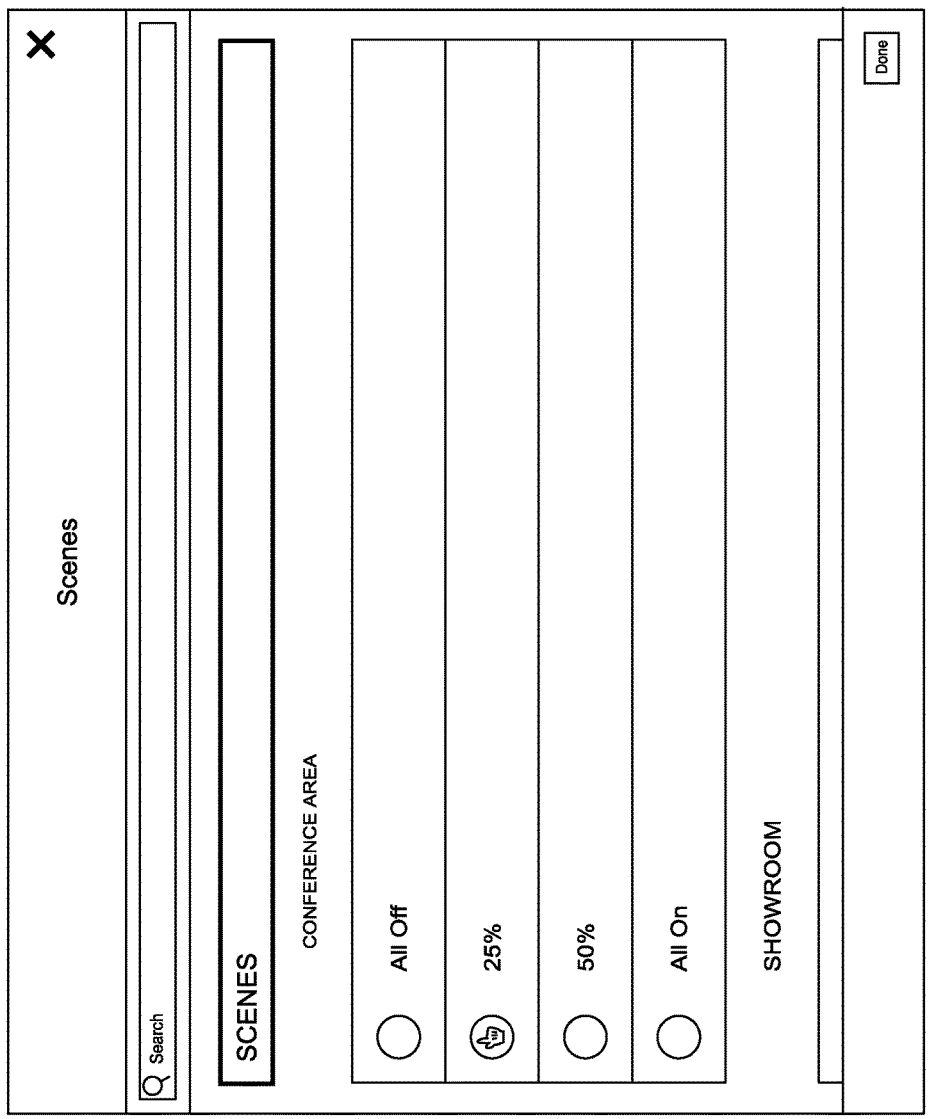
FIG. 15 is an exemplary screen layout of the graphical user interface illustrating the user control device scene selection.
Figure 16:
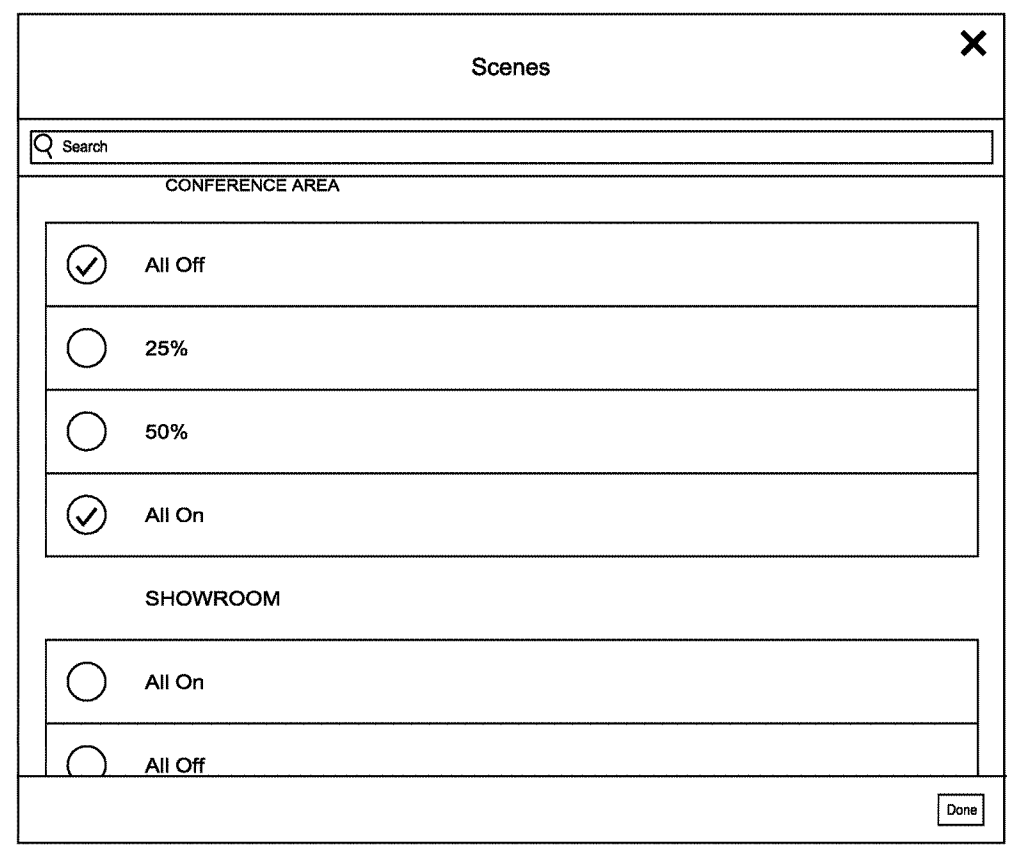

To improve lighting control relative to daylight hours, sunset and sunrise times are used by the system 12, for example, to control when different "scenes" are configured as depicted in FIGS. 14-16; during commissioning of a gateway 24 or later during configuration, a user or administrator enters the zip code where the site system 14, including the gateway 24, is located and the server system 12 uses the zip code to determine an approximate latitude and longitude of the site system 14 for sunrise/sunset calculations. Determining the latitude and longitude based on only the zip code and calculating and storing that information at the server system 12 adds an extra layer of security to assist in obscuring the precise physical location of the site system 14.

The flowchart 500 of FIG. 5 represents the exemplary method for configuring a user control device 43, such as the exemplary dimmer switch 700, of the wireless device control system 10. The method begins at a START, step 502, and proceeds to a first step, shown at step 504, for commissioning of the system devices 26. Once the site system 14 is planned and deployed, and the device 26 is properly commissioned at step 504 (for example, according to flowchart 400 of FIG. 4), the user 42 may begin remotely managing and controlling the device 26. When a user 42 logs into their account, all sites, or site systems 14, associated with the user 42 may be visible through the graphical user interface 1000 as depicted in step 506 and in the screenshots of FIGS. 11-21, and particularly the user control devices 43 shown as entries 1002 in FIG. 11.

At step 508, and with continued reference to FIG. 11, the user 42 may select one of the sites or site systems 14, wherein entries 1002 representative of connected devices 26 are visible through the graphical user interface 1000 and include information such as unique device identifiers, as shown in FIG. 11. Once an entry 1002 is selected, the user 42 is presented with a set of configurable options specific to the device associated with that entry 1002. More specifically, if the entry 1002 represents the exemplary wall dimmer switch 700, the graphical user interface 1000 will present a list of configurable options similar to those shown in FIG. 11, which is based upon the properties and capabilities of the wall dimmer switch 700, including for example based upon the properties and capabilities of the particular firmware update for the wall dimmer switch 700. For example, as shown in graphical user interface 1000 of FIG. 11, the user 42 can select to edit mode and other INFO and CONTROL ZONES and AUTOMATIONS associated with the selected dimmer switch 700. If a touchscreen device 701 is selected, a customized set of configurable options would be presented by the graphical user interface 1000 at step 508, for example, INFO, CONTROL ZONES, and CONTROL SCENES selectable for editing as shown in FIGS. 20 and 21.

At step 510, and with reference to FIG. 12, the user 42 can enter into the device settings screen of the selected entry 1002. A user may configure the device mode, for example, "dimmer" mode, "switch" mode, or "scenes" mode, to virtually map to the selected device. Depending on the type of user control device 43, the mode selection provides a set of general functional features and advantageously allows for one type of physical device to be virtually reconfigured to operate in any one of several different functional operating modes. For example, in "dimmer" mode, the selected wall dimmer switch 700 of FIG. 12 would allow the user 42 to configure the user interface elements 726 and 728 as dimming pushbuttons, wherein a press or press/hold of the upper pushbutton 726 would incrementally increase the lighting output while a press or press/hold of the lower pushbutton 728 would incrementally decrease the lighting output. Additionally, this mode can provide ON/OFF control in response to a different user interaction with the user interface elements 726 and 728, for example, a momentary press and release interaction rather than a press and hold interaction. In "switch" mode for the selected wall dimmer switch 700, a user 42 could assign the user interface elements 726 and 728 to operate only as ON/OFF pushbuttons. Additionally, in "scene" mode, a user could configure the user interface elements to generate a configurable scene output as described further below. This step also allows a user 42 to virtually actuate the "indicate" function from the graphical user interface 1000 via the "Indicate" pushbutton 1004.

At step 512, and with reference to FIGS. 13-16 and 20-21, the user 42 can select zones, scenes, or other lighting effects to associate with the selected user control device 43. Referring to FIG. 13, a listing of areas (e.g. CONFERENCE and SHOWROOM) and zones within each area (e.g. SPOTLIGHTS and CONFERENCE ROOM for the CONFERENCE area) are displayed and can be selected (or deselected) for virtual mapping to and association with the selected user control device 43. For example, for the exemplary dimmer switch 700 having two user interface elements 726 and 728, one or more zones can be selected to be simultaneously controlled in switch or dimmer mode. Alternatively, if in step 510 scene mode is selected for the dimmer switch 700, as shown in FIG. 14, then in step 512 the illustrative graphical user interface screen of FIG. 15 will be displayed. The displayed scenes available for selection, for example, for each area "All Off," "25%," "50%," and "All On," are those scenes earlier configured for site 14 using user computer device 16 as discussed further below. For example, as shown in FIG. 16, two scenes, "All Off" and "All On," are selected to be associated with dimmer switch 700 and available to virtually map to user interface elements 726 and 728.

Figure 20:
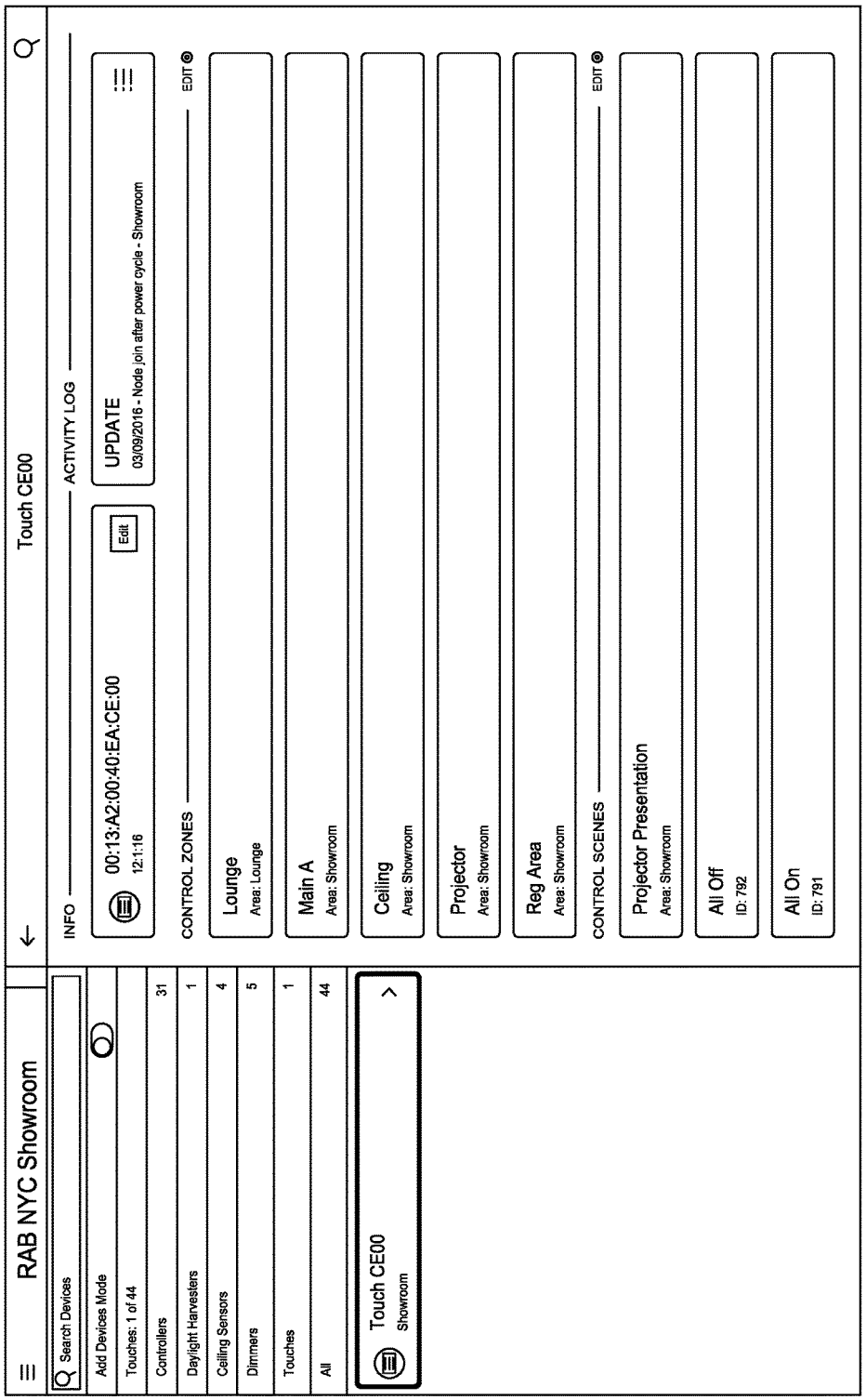
FIG. 20 is an exemplary screen layout of the graphical user interface illustrating configuration of a touch-enabled user control device.
Figure 21:
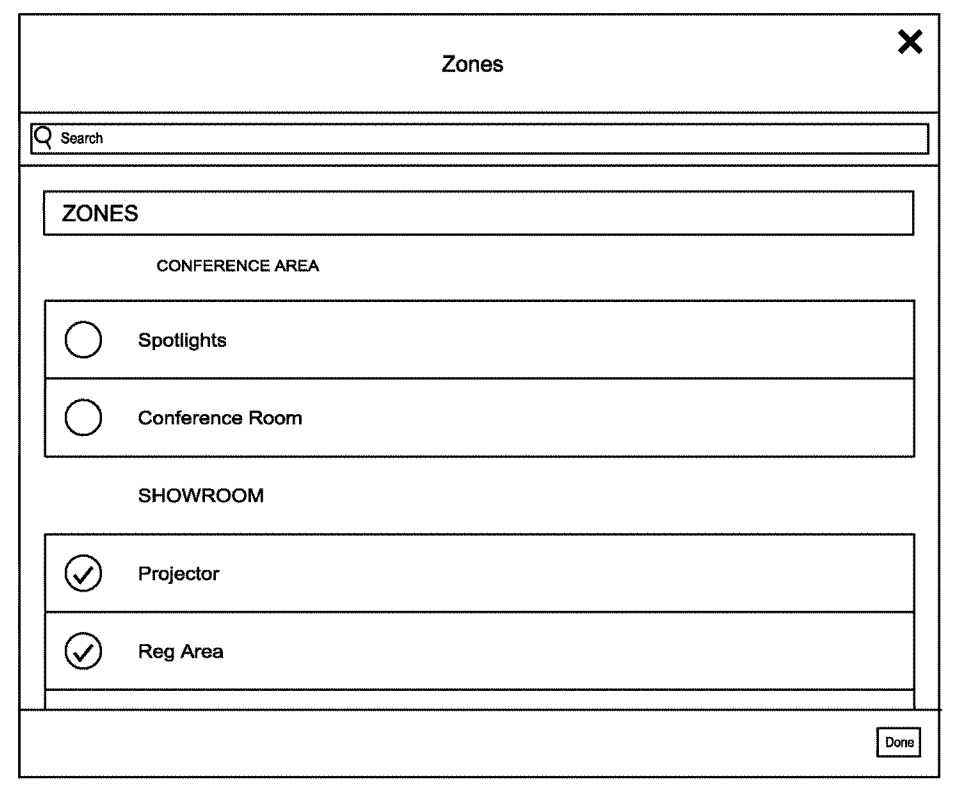

At step 512, if the selected user control device 43 is a touchscreen device 701 (FIG. 19), then at the graphical user interface screen of FIG. 20 ZONES and CONTROL SCENES can be selected for editing, i.e., selecting the user interface elements, e.g., zone on/off 1010, zone dimmer sliders 1012, and scenes selectors 1014, that will be displayed for touch-activation as shown in FIG. 19. For example, after selecting ZONES, FIG. 21 illustrates a graphical user interface screen for selecting which zones of site 14 to associate with device 701 and provide touch-activated graphical user interface elements for display.

Figure 17:
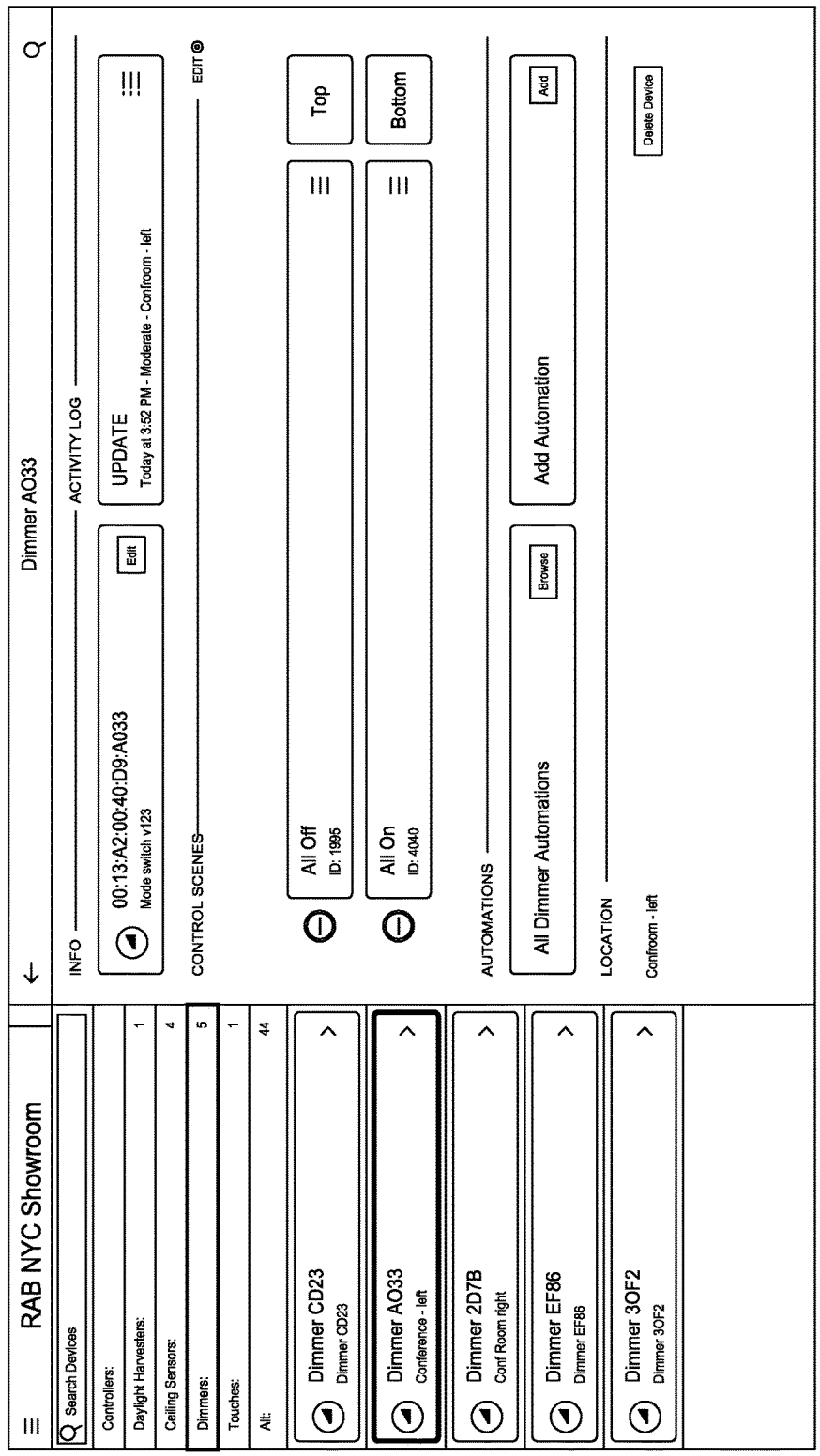
FIG. 17 is an exemplary screen layout of the graphical user interface illustrating the user control device of FIG. 16 allowing a user to associate the selected scenes with each user interface element.

At step 514, and with reference to FIG. 17, after selecting scenes in step 512 to be associated with wall dimmer 700, the scenes, e.g. "All Off" and "All On," can be virtually mapped to the available user interface elements, e.g., "top" user interface element 726 and "bottom" user interface element 728, as shown to the right of the selected scene. In the example shown in FIG. 17, the list of scenes to the left can be reordered to change the virtual mapping with the user interface elements 726 and 728 to the right by touching and dragging a particular scene to reposition it in the list, thereby changing the virtual mapping to what is then displayed. For embodiments of a user control device 43 for which fewer or more user interface elements are provided, the list of available elements to the right for virtual mapping will be automatically populated to be shorter or longer in accordance with the particular device as recognized by the gateway 24 and/or the remote server system 12.

Figure 18:
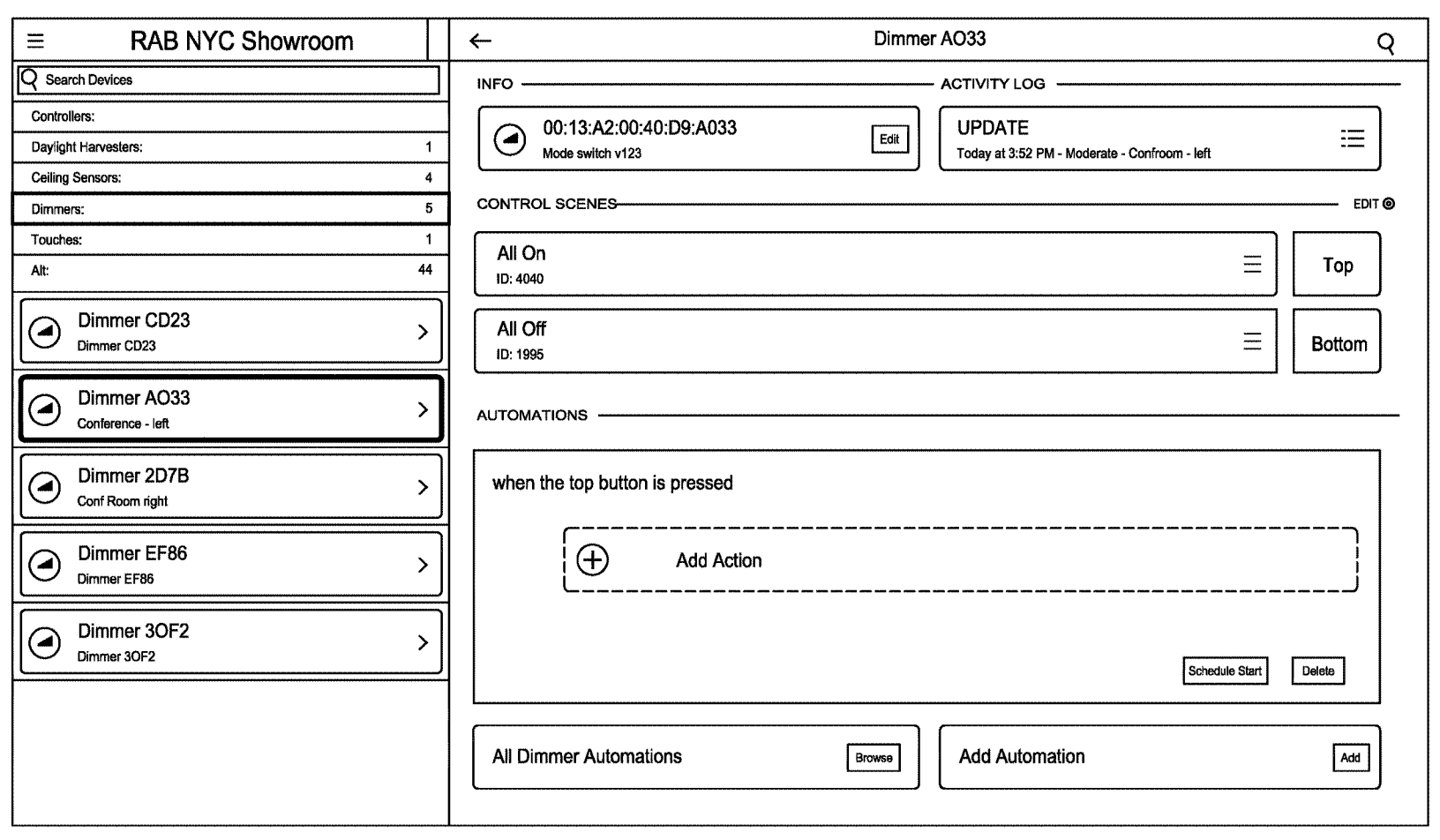

At step 516, and with reference to FIG. 18, automations, including schedules, can be optionally associated with one or more user interface elements of the user control device 43. Automations are behaviors performed in accordance with a set of rules and based on conditions defined within the rules and are discussed further below. For example, an illustrative example for an automation associated with the dimmer switch 700 selected to operate in scene mode is to condition the scene selected based on the time of day and day of week. For example, during normal working hours/days the upper user interface element 726 is automated to select the "50%" scene and the lower user interface element 728 is automated to select the "25%" scene, and during non-working hours/days the upper element 726 is automated to select the "All On" scene and the lower element 728 is automated to select the "All Off" scene. Other automations based on other conditions, including those discussed further below may also be used as part of the association and virtual mapping for user control devices 43, including the dimmer switch 700 and touchscreen device 701.

At step 518 the configurations selected are saved to the server system 12, gateway 24, and for some embodiments, the user control device 43. At END step 520 the process of flowchart 520 is completed.

Optionally, if configurations are saved to the user control device 43, the gateway 24 may then be decommissioned or disconnected from the site system 14. More specifically, the gateway 24 may either be powered off and removed from the site system 14 or disabled from network connectivity and the user control device 43 may then communicate and execute configured lighting effects independently and without communication to or from the gateway 24. In this mode of operation, the user control device 43 may still communicate directly with multiple devices 26 of the site system 14 to accomplish the configured lighting effects. Alternatively, after commissioning and configuration is complete, the gateway 24 may be disconnected from the server system 12 and the site system 14 may operate independent of any communication or device outside of the site system. For example, gateway 24 may continue to operate as the controller of the mesh network 28; however, the gateway 24 may not require ongoing communication with the server system 12 to operate. For example, optionally, the WAN 20, 22 is used for commissioning and configuration, but not used to communicate between gateway 24 and server system 12 for subsequent operation of the site system 14.

Mesh Network Security

Although other mesh networks can be used, the illustrative mesh network 28 uses ZigBee, an open global standard for low-power, low-cost, low-data-rate, wireless mesh networking based on the IEEE 802.15.4 standard. Through its mesh and routing capabilities, networks such as ZigBee allows the transmission of data over long distances by passing the data through a mesh network of intermediate nodes to reach more distant ones. It represents a network layer above the 802.15.4 layers to support advanced mesh routing capabilities. The ZigBee specification is developed by a growing consortium of companies that make up the ZigBee Alliance. ZigBee Smart Energy Standard, ZigBee Profile: 0x0109, Revision 19, Version 1.2a, Document 07-5356-19, incorporated by reference herein in its entirety, describes device high-level communication protocols used to create personal area networks with small, low-power digital radios, including the installation and use of security keys.

Each ZigBee network must be formed by one, and only one, coordinator, which is the gateway 24 in the illustrative embodiment of control system 10. The devices 26 of the wireless device control system 10 can be a router type or an end type device; however, for typical installations, most devices 26 will be a router. A router is a full-featured ZigBee node and perform various functions including join existing networks and send, receive, and route information (routing involves acting as a messenger for communications between other devices that are too far apart to convey information on their own). A network may have multiple router devices. An end device is essentially a reduced version of a router. The end device cannot act as messenger between any other devices but is capable of receiving messages intended for it and transmitting messages initiated by it.

Automations

Automations, also referred to as behaviors, may represent sets of rules, or if/then conditions that bind input events into output events or actions. An action is a command that is enacted when a condition is fulfilled, for example, commanding a zone state or commanding a scene. An action can also be a system notification provided via a user interface of a user computer device 16.

For example, with regard to controllers 37, some input events satisfying a condition/event that triggers an automation may include power measurements, such as voltage or wattage, exceeding or falling below a predetermined threshold, and the detection that particular circuits have opened or closed, such as a controller's zone being switched on with a wall switch, and schedules, as discussed further below, for example, expiration of a delay time or a particular time of the day and/or day of the week. With regard to occupancy sensors 130, some exemplary conditions may include motion detection and motion timeout expiration. Some conditions pertaining to daylight harvesters may include detected light levels exceeding or falling below predetermined thresholds.

Exemplary actions responsive to those exemplary behaviors may include switching a device and/or zone on or off, setting or changing a dim level, and activating a particular scene, which is described further above for user control devices. Some actions may trigger upon the satisfaction of multiple conditions. For example, a certain condition may automatically occur if a particular sensor state change is detected AND it is within a certain time period of the day. Automations can save energy, for example, by switching off particular zones when the occupancy sensor 130 detects expiration of a motion timeout period, or dimming or switching off particular zones responsive to light levels detected by the daylight harvester. An automation configuration view of the graphical user interface 1000 is depicted in FIG. 18 and includes a list of devices having the associated conditions. The addition of conditions to a device is shown in in FIG. 24C.

Scenes

Scenes describe a set of state change requests, such as an area or set of zones and each of their dimming level presets. Scenes, which are essentially a group of light settings, may be activated manually or at specific times defined in a schedule. For example, a "presentation mode" may have some lights on, some lights off, and some lights dimmed to 50%. Illustrations of scene configuration views on the graphical user interface 1000 are shown in screen layouts of FIGS. 14-17.

Schedules

Schedules allow you to set the lights to come on and off at specific times with optional repetition. For example, a schedule can define a week's worth of events. Schedules can apply to one or more devices, zones or areas. An event could be a scene selection. Time segments throughout the day may be associated with different scenes.

In some embodiments, control for automations, scenes, and schedules reside in the gateway, so loss of connection to the cellular network (and, therefore, the server system) does not affect use of these functions. Taking automations as an example, a dimmer switch can have an on/off/dim as a primary function, but may also have automations such as (i) once the light is on, the light dims or goes off after a particular time, or (ii) after the light is turned off, the lights in the parking lot turn on for a particular time. In this example, items (i) and (ii) can be automations whose functionality resides at the gateway.

What is claimed is:

1. A configurable user control device for a lighting control system, the lighting control system having at least one lighting control device and a wireless gateway in communication with a server system, the configurable user control device comprising:
a plurality of user interface elements each capable of receiving a plurality of different types of user interactions;
a processor coupled to the plurality of user interface elements and programmed to detect each of the plurality of different types of user interactions with each of the plurality of user interface elements; and
a wireless transceiver coupled to the processor; and
wherein the configurable user control device is configured using virtual mapping set via a graphical user interface that is not directly associated with the configurable user control device, the virtual mapping enabling the configurable user control device to control lighting in the lighting control system by associating together at least the following:
one of the plurality of different types of user interactions;
one of the plurality of user interface elements;
at least one of the at least one lighting control devices; and
a lighting effect; and
wherein upon the processor detecting one of the plurality of different types of user interactions at one of the plurality of user interface elements, the wireless transceiver of the configurable user control device provide a wireless transmission of control instructions for the lighting effect to the at least one of the at least one lighting control device in accordance with the virtual mapping.

2. The configurable user control device of claim 1, wherein the wireless transmission is directed to the at least one lighting control device to control one or more lighting devices according to the control instructions.

3. The configurable user control device of claim 2, wherein the at least one lighting control device communicates lighting state changes to the wireless gateway.

4. The configurable user control device of claim 1, wherein the transmission is directed to the wireless gateway of the lighting control system.

5. The configurable user control device of claim 1, wherein the lighting effect is dimming control for the at least one lighting control devices of the lighting control system.

6. The configurable user control device of claim 1, wherein the lighting effect is a scene selection for the lighting control system.

7. The configurable lighting control system of claim 1, wherein the graphical user interface displays available configuration selections for the configurable user control device based on a type of configurable user control device detected and the capabilities of the detected type of configurable user control device.

8. The configurable user control device of claim 1, wherein the virtual mapping for the configurable user control device is automated to map the one of the plurality of different types of user interactions and the one of the plurality of user interface elements to a different one of at least one of:
    the at least one lighting control device; and
    the lighting effect, upon detection of a user-defined condition.

9. The configurable user control device of claim 8, wherein the user-defined condition is at least one of a time period of the day and a sensor state.

10. A configurable lighting control system, comprising:
    a server system connected to a wide area network and having control software for configuring devices remotely located at a site;
    a local wireless network located at the site;
    a wireless gateway located at the site and configured to communicate with the server system via the wide area network and configured to communicate with the devices via the local wireless network;
    the devices including at least one lighting control device and at least one user control device;
    the at least one user control device, each configured to communicate with the wireless gateway, and each having a plurality of user interface elements each capable of detecting a plurality of different types of user interactions; and
    a user computer device capable of communicating with the server system and having a graphical user interface allowing a user to configure the at least one user control device;
    wherein user configuration includes using the graphical user interface to virtual map the association of at least the following:
        one of the plurality of different types of user interactions;
        one of the plurality of user interface elements;
        at least one of the at least one lighting control devices; and
        a lighting effect; and
    wherein the at least one user control device wirelessly communicates control instructions to the at least one lighting control device for the associated lighting effect upon detection of the one of the plurality of different types of user interactions for the one of the plurality of user interface elements.

11. The configurable lighting control system of claim 10, wherein the communication of control instructions is directed to the at least one lighting control device to control one or more lighting devices.

12. The configurable lighting control system of claim 11, wherein the at least one lighting control device communicates lighting state changes to the wireless gateway.

13. The configurable lighting control system of claim 10, wherein the communication of control instructions is directed to the wireless gateway of the lighting control system.

14. The configurable lighting control system of claim 10, wherein the lighting effect is setting a dim level for one or more lighting devices of the lighting control system.

15. The configurable lighting control system of claim 10, wherein the user computer device can be used to control the at least one user control device to produce the lighting effect.

16. The configurable lighting control system of claim 10, wherein the local wireless network is a wireless mesh network.

17. The configurable lighting control system of claim 16, wherein the at least one user control device acts as a repeater to extend the area encompassed by the mesh network.

18. The configurable lighting control system of claim 10, wherein the lighting effect is setting a scene selection for the lighting control system.

19. The configurable lighting control system of claim 10, wherein the graphical user interface allows the user to pre-define lighting effect automations associated with the plurality of user interface elements of the at least one user control device.

20. The configurable lighting control system of claim 10, wherein the graphical user interface displays available configuration selections for each of the at least one user control device based on a type of user control device detected and the capabilities of the detected type of user control device.

21. The configurable lighting control system of claim 10, wherein the wireless gateway is used for configuration of the lighting control system and then the lighting control system operates as configured without at least one of the wireless gateway and the server system.

22. A method of configuring a user control device for a lighting control system, wherein the lighting control system includes a server system, a site system, and a wireless gateway of the site system, comprising the steps of:
    commissioning lighting control devices and configuring them to communicate with the wireless gateway, wherein the lighting control devices are coupled to and selectively powering at least one lighting device;
    commissioning user control devices and configuring them to communicate with the wireless gateway, the user control devices each having a plurality of user interface elements capable of detecting a plurality of different types of user interactions;
    displaying a list of user control devices on a graphical user interface of a user computer device, wherein the server system compiles and provides the list of user control devices based upon their communication with the server system;
    selecting a user control device from the list to configure from the graphical user interface, wherein configuration includes virtual mapping made available by the graphical user interface and is based at least in part on the capabilities of the particular user control device detected, the virtual mapping including:
        displaying and selecting one or more lighting control devices;
        displaying and selecting an available lighting effect;
        displaying and selecting one of the plurality of user interface elements; and
        displaying and selecting one of the plurality of different types of user interactions; and
    transmitting the virtual mapping association to at least one of the wireless gateway and the selected user control device.

23. The method of claim 22, further comprising the step of displaying and selecting available control modes for the selected user control device.

24. The method of claim 23, wherein the available control modes includes dimmer and scene selector.

25. The method of claim 22, wherein the selected lighting effect is an automation to produce lighting effects based upon a trigger event or condition and without user intervention.

26. The method of claim 22, wherein the available lighting effects includes on, off, and dimming.

27. The method of claim 22, wherein at least one of the server system, wireless gateway, and the selected user control device stores the association.

28. The system of claim 10, wherein the user configuration can be initiated without physically contacting the lighting control device.

29. The method of claim 22, wherein configuring the selected user control device does not require physically contacting the selected user control device.

* * * * *